(12) United States Patent
Higgins et al.

(10) Patent No.: US 12,328,239 B2
(45) Date of Patent: *Jun. 10, 2025

(54) SYSTEMS AND METHODS FOR BOT SELECTION CALIBRATION IN TWO-WAY COMMUNICATIONS

(71) Applicant: LIVEPERSON, INC., New York, NY (US)

(72) Inventors: Michael Higgins, New York, NY (US); Matthew Dunn, Arlington, MA (US)

(73) Assignee: LIVEPERSON, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,753

(22) Filed: Sep. 29, 2022

(65) Prior Publication Data

US 2023/0129324 A1 Apr. 27, 2023

Related U.S. Application Data

(63) Continuation of application No. 17/563,723, filed on Dec. 28, 2021, now Pat. No. 11,489,739.

(60) Provisional application No. 63/131,434, filed on Dec. 29, 2020.

(51) Int. Cl.
*H04L 41/5051* (2022.01)
*H04L 41/50* (2022.01)
*H04L 51/02* (2022.01)
*H04L 51/23* (2022.01)

(52) U.S. Cl.
CPC ...... *H04L 41/5051* (2013.01); *H04L 41/5093* (2013.01); *H04L 51/02* (2013.01); *H04L 51/23* (2022.05)

(58) Field of Classification Search
CPC . H04L 51/02; H04L 41/5051; H04L 41/5093; H04L 51/30; H04L 51/23
See application file for complete search history.

(56) References Cited

U.S. PATENT DOCUMENTS

| 11,489,739 | B2 * | 11/2022 | Higgins | H04L 51/214 |
| 2019/0199658 | A1 * | 6/2019 | Kim | H04L 51/214 |
| 2019/0347326 | A1 | 11/2019 | Kozhaya et al. | |
| 2019/0370629 | A1 * | 12/2019 | Liu | G06N 5/041 |
| 2020/0137002 | A1 | 4/2020 | Chavda | |

(Continued)

OTHER PUBLICATIONS

International Search Report and Written Opinion of Apr. 5, 2022 for PCT Application No. PCT/US2021/065354, 12 pages.

(Continued)

*Primary Examiner* — Soe Hlaing
(74) *Attorney, Agent, or Firm* — POLSINELLI LLP

(57) ABSTRACT

The present disclosure relates generally to facilitating two-way communications. One example involves receiving input data as part of a two-way communication session associated with a plurality of bots, accessing confidence scores from the bots. Mapped scores are then generated for the plurality of bots from the confidence scores using a bot score mapper. A selected bot is identified using the mapped scores, and the two-way communication session is facilitated using the selected bot. Further, techniques are provided to track performance of the selected bot and dynamically updated mapping adjustments in the bot score mapper using feedback and machine learning systems.

27 Claims, 17 Drawing Sheets

(56) References Cited

U.S. PATENT DOCUMENTS

2020/0342850 A1* 10/2020 Vishnoi .................. G06F 40/30
2020/0351405 A1 11/2020 Pace
2020/0372055 A1* 11/2020 Joko ....................... G06F 40/30

OTHER PUBLICATIONS

Notice of Allowance of Jun. 30, 2022, for U.S. Appl. No. 17/563,723; 10 pages.

* cited by examiner

SYSTEMS AND METHODS FOR BOT SELECTION CALIBRATION IN TWO-WAY COMMUNICATIONS

CROSS-REFERENCE TO RELATED APPLICATIONS

The present patent application is a continuation of U.S. patent application Ser. No. 17/563,723 filed Dec. 28, 2021, which claims the priority benefit of U.S. provisional patent application No. 63/131,434 filed Dec. 29, 2020, the disclosures of which are incorporated by reference herein.

FIELD

The present disclosure relates generally to facilitating two-way communications. More specifically, techniques are provided to dynamically identify bots or similar automated support systems to improve the content in a two-way communication, and to transfer messaging between a network device and a terminal device to a bot and to track performance of the bot during automation.

BACKGROUND

Clients often use telephony systems and/or network-based chat systems to field communications from users seeking assistance with products or services. Communication systems that support such user interactions may allow users to speak or chat with a live representative of the client. Such communication systems may additionally or alternatively use automated bot systems for two-way interactions with users.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Examples described herein relate to communication systems configured to provide information to users with assisted computing-based systems, which can be referred to as "bots". Such systems can be configured to provide assistance and to facilitate a two-way communication for a wide variety of user inquiries. Given that the nature of the user inquiry covers a broad possible range, categorizing a user intent associated with system communications and identifying appropriate systems for a response is a primary concern in providing a user with a positive experience.

A communication system can be associated with many different bots to assist with the wide variety of user inquiries. Because individual bots are often associated with a particular user intent or task, one aspect of a positive user experience is identifying a useful or effective bot in response to a user inquiry. One way that bots operate in this context is for the bot to accept input data (e.g., text from a user query) and to respond with a confidence score. In a system with many bots (e.g., dozens, hundreds, thousands, or more bots), the confidence scores returned by the bots are not related or standardized. Further, feedback systems that attempt to modify or update a bot can have unintended impacts on the operation of the bot.

Examples described herein use a calibration system that can use locally relevant feedback to adjust calibration scores for bots in response to user input data. The adjustment can function as a mapping to correct the calibration scores for locally relevant data, and to select a bot dynamically using a mapped score that is adjusted from the bot provided calibration score. The mapping or calibration system can provide improvements to the accuracy of a bot selection process while avoiding the complexity associated with modifying the bots themselves. The mapping process instead acts as an overlay or independent modification to the calibration scores in order to efficiently improve bot selection. Independence from bot operation can further allow recognition of bot modifications, incorporation of real-time feedback to both bot training and bot use to appropriate weigh the impact of feedback on mapping systems, and can allow efficient use of computing resources for integrating feedback into bot selection. Additional examples and variations are also possible as described herein and throughout the specification.

Certain embodiments of the present disclosure include a system. The system may include one or more data processors; and a non-transitory computer-readable storage medium containing instructions which, when executed on the one or more data processors, cause the one or more data processors to perform the methods described above and herein.

Certain embodiments of the present disclosure include a computer-program product tangibly embodied in a non-transitory machine-readable storage medium, including instructions configured to cause a data processing apparatus to perform the methods described above and herein.

BRIEF DESCRIPTION OF THE DRAWINGS

The present disclosure is described in conjunction with the appended figures.

Figure 1:
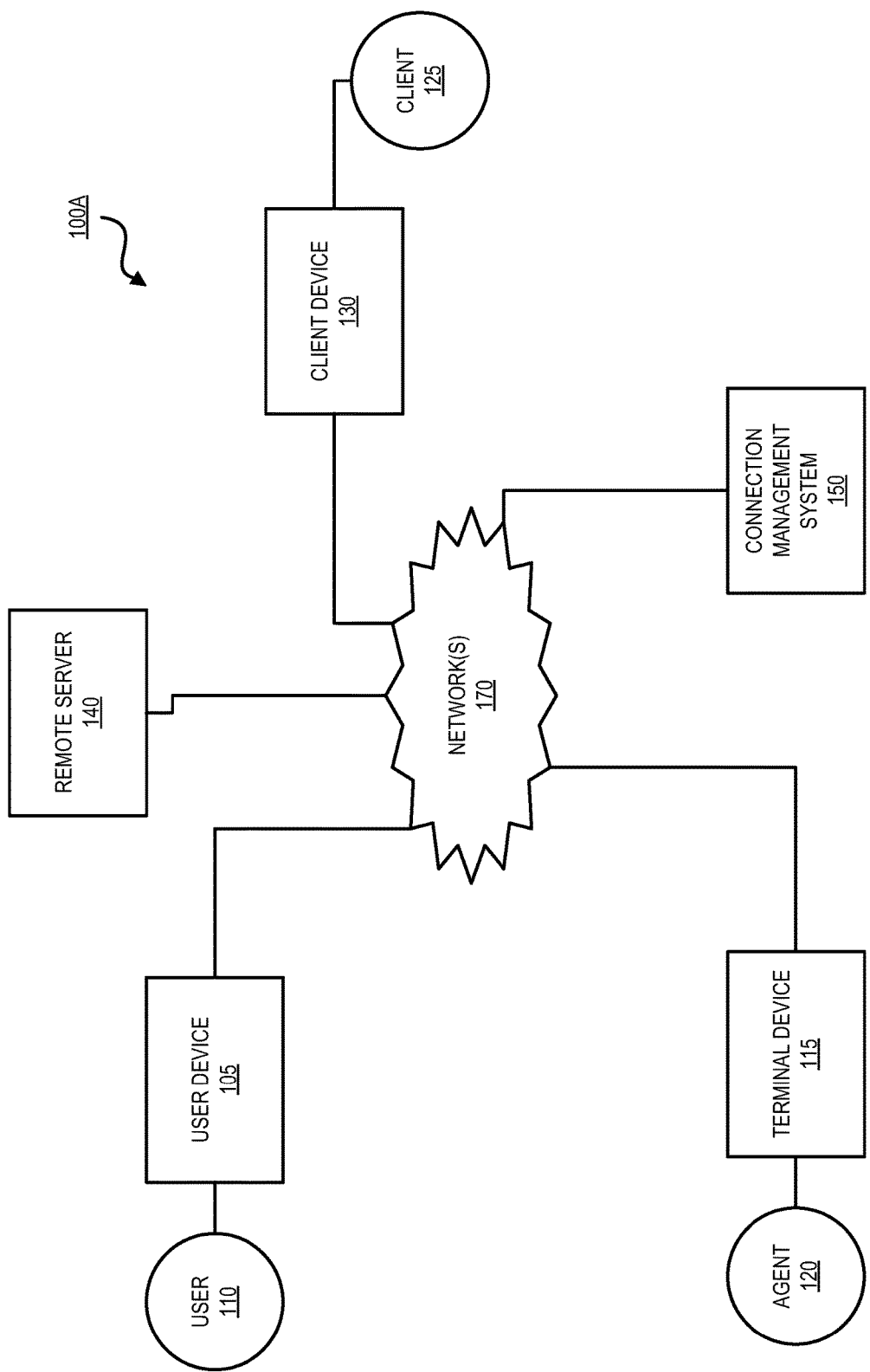
FIG. 1 shows a block diagram of an embodiment of a network interaction system that can be used in accordance with examples described herein.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

As described above, examples relate to communication systems configured to provide information to users with assisted computing-based systems, which can be referred to as "bots". When a user (e.g., an individual or customer of a business) contacts or is contacted via a two-way communication system for information related to a client (e.g., a merchant or business providing information or service via the two-way communication system), such bots can be configured to provide assistance either in a completely automated fashion, or by assisting agents to respond to wide variety of user inquiries. Given that the nature of the user inquiry covers a broad possible range, categorizing a user intent associated with system communications and identifying appropriate systems for a response is a primary concern in providing a user with a positive experience.

A communication system can be associated with many different bots to assist with the wide variety of user inquiries. Individual bots are often associated with a customized task, and can use natural language understanding (NLU) to create a positive user experience by identifying if the bot is relevant to a user inquiry. One way that bots operate in this context is for the bot to accept input data (e.g., text from a user query), process the data with an NLU system, and respond with a confidence score. In a system with many bots (e.g., dozens, hundreds, thousands, or more bots), the confidence scores returned by the bots are not related or standardized. Additionally, a bot may be trained on data that has different characteristics than the local data associated with a specific implementation or set of customers for a merchant. The relevance of a bot determined based on general training data may thus be different than the relevance of a bot to a particular local implementation, with associated different "correct" confidences scores.

Examples described herein use a mapping or calibration system to modify bot-generated confidence scores. Locally relevant feedback can be used to adjust calibration scores for bots. The adjustment can function as a mapping to correct the calibration scores for locally relevant data, and to select a bot dynamically using a mapped score that is adjusted from the bot provided calibration score. The mapping or calibration system can provide improvements to the accuracy of a bot selection process while avoiding the complexity associated with modifying the bots themselves. The mapping process instead acts as an overlay or independent modification to the calibration scores in order to efficiently improve bot selection. Independence from bot operation can further allow recognition of bot modifications, incorporation of real-time feedback to both bot training and bot use to appropriate weigh the impact of feedback on mapping systems, and can allow efficient use of computing resources for integrating feedback into bot selection.

Some examples can additionally track local feedback to seek a locally relevant confidence score different from the bot's natural confidence score using adaptive feedback mechanisms that adjust the amount of adjustment made in each feedback loop to efficiently find the locally relevant confidence score, and to track changes in the score over time. For example, initial feedback can be used to make large calibration adjustments, and the size of the calibration adjustments can be reduced over time as additional local feedback is received. Additionally, in some examples, the mapping system can identify when a bot is changed or revised, and reset a feedback system based on this identification. For example, if a bot begins consistently returning a different confidence score in response to the same input, the calibration system can reset the feedback systems. In some examples, a bot revision can be identified from other bot-provided data (e.g., reporting on bot revisions, changes in input commands, etc.)

FIG. 1 shows a block diagram of an embodiment of a network interaction system 100 which implements and supports certain embodiments and features described herein. Certain embodiments relate to establishing a connection channel between a network device 105 (which can be operated by a user 110) and a terminal device 115 (which can be operated by an agent 120). In certain embodiments, the network interaction system 100 can include a client device 130 associated with a client 125.

In certain embodiments, a user 110 can be an individual browsing a web site or accessing an online service provided by a remote server 140. A client 125 can be an entity that provides, operates, or runs the web site or the online service, or individuals employed by or assigned by such an entity to perform the tasks available to a client 125 as described herein. The agent 120 can be an individual, such as a support agent tasked with providing support or information to the user 110 regarding the website or online service. Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual shopping an online store from a personal computing device, a client 125 can be a company that sells products online, and an agent 120 can be a representative employed by the company. In various embodiments, the user 110, client 125, and agent 120 can be other individuals or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications. Additionally, any device implementing bot calibration or bot selection can perform the calibration and associated bot selection both dynamically and in real-time, as well as simultaneously as a parallel process with many bot systems. Such simultaneous bot operation can involve a device or system executing many bots at the same time, with feedback, calibration, and updates to a bot selection system occurring at the same time (e.g., in parallel) for the bots executed by a single system. One bot can operate, for example, to communicate with a customer at the same time that another customer is providing feedback associated with a bot from a separate communication, and a third bot can be initiated using updated bot calibration metrics at the same time that operations associated with the other two bots, or any number of other bots, are occurring.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message. The identification of the terminal device 115 can include a technique described, for example, in U.S. application Ser. No. 12/725,799, filed on Mar. 17, 2010, which is hereby incorporated by reference in its entirety for all purposes.

In some instances, connection management system 150 can determine whether any connection channels are established between network device 105 and a terminal device associated with the client (or remote server 140) and, if so, whether such channel is to be used to exchange a series of communications including the communication.

Upon selecting a terminal device 115 to communicate with network device 105, connection management system 150 can establish a connection channel between the network device 105 and terminal device 115. In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some embodiments, connection management system 150 can monitor the communication exchange in real-time and perform automated actions (e.g., rule-based actions) based on the live communications. For example, when connection management system 150 determines that a communication relates to a particular item (e.g., product), connection management system 150 can automatically transmit an additional message to terminal device 115 containing additional information about the item (e.g., quantity of item available, links to support documents related to the item, or other information about the item or similar items).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
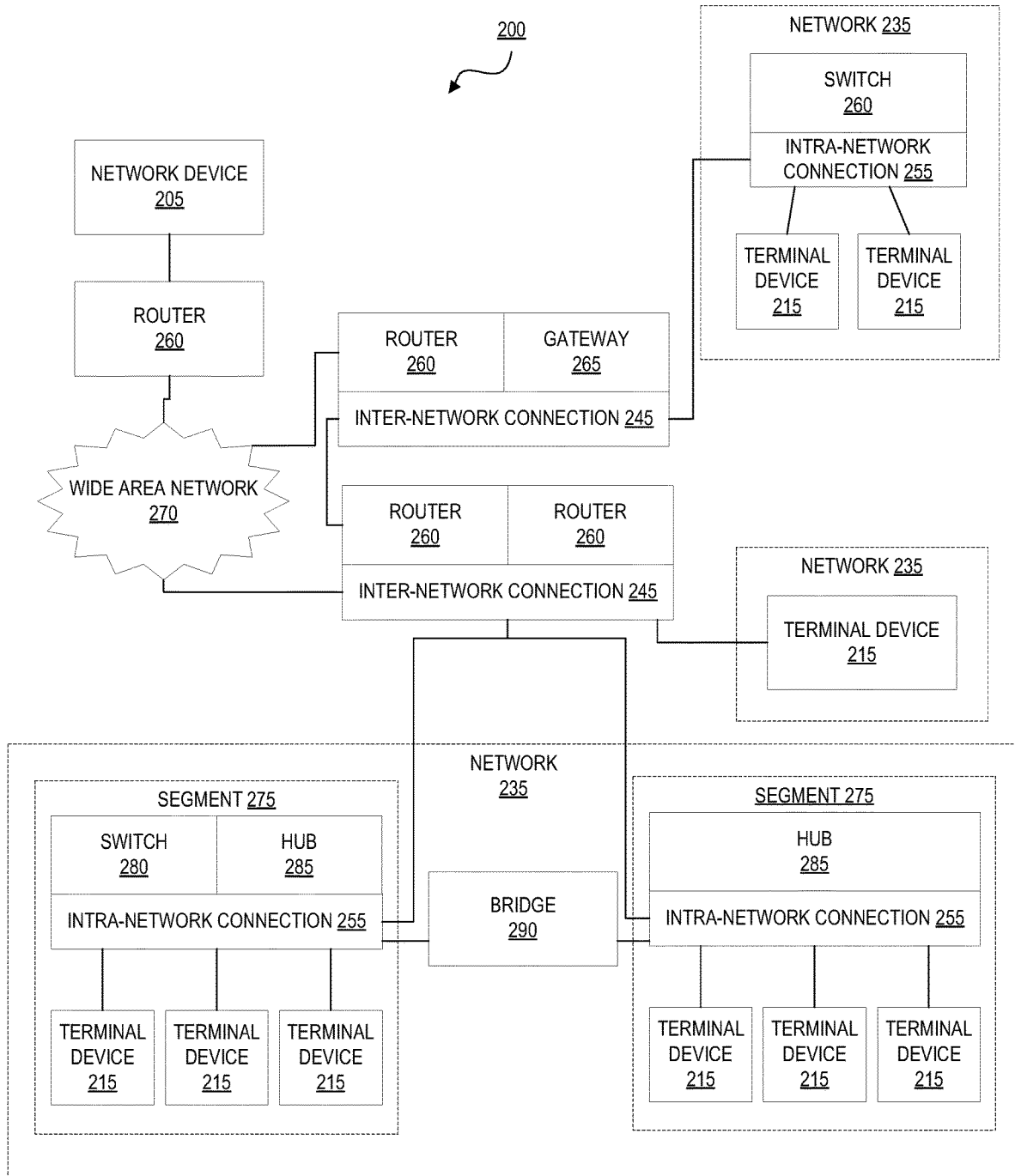
FIG. 2 shows a block diagram of another embodiment of a network interaction system that can be used in accordance with examples described herein.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
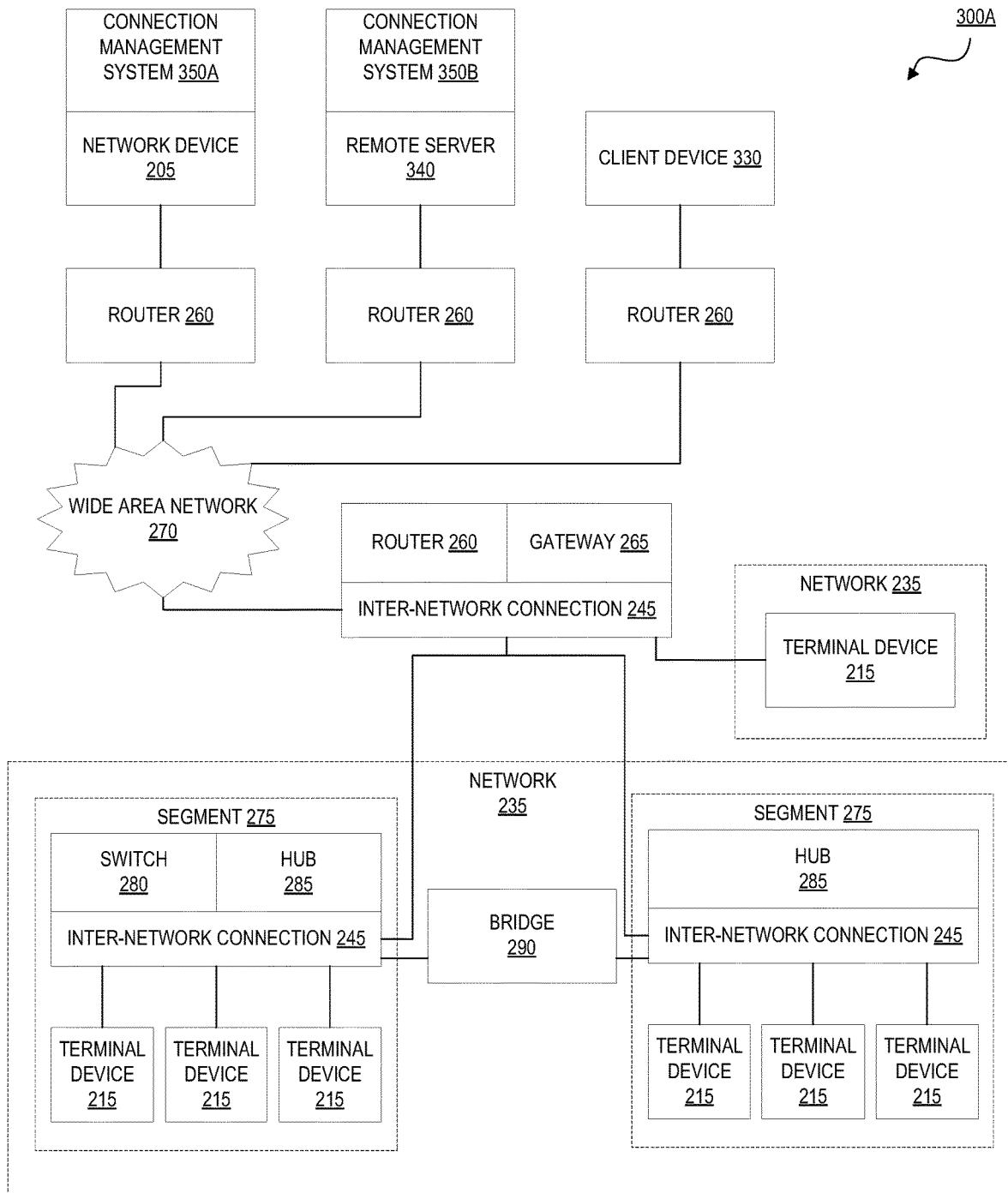
FIGS. 3A-3C show block diagrams of other embodiments of a network interaction system that includes a connection management system that can be used in accordance with examples described herein.
Figure 3B:
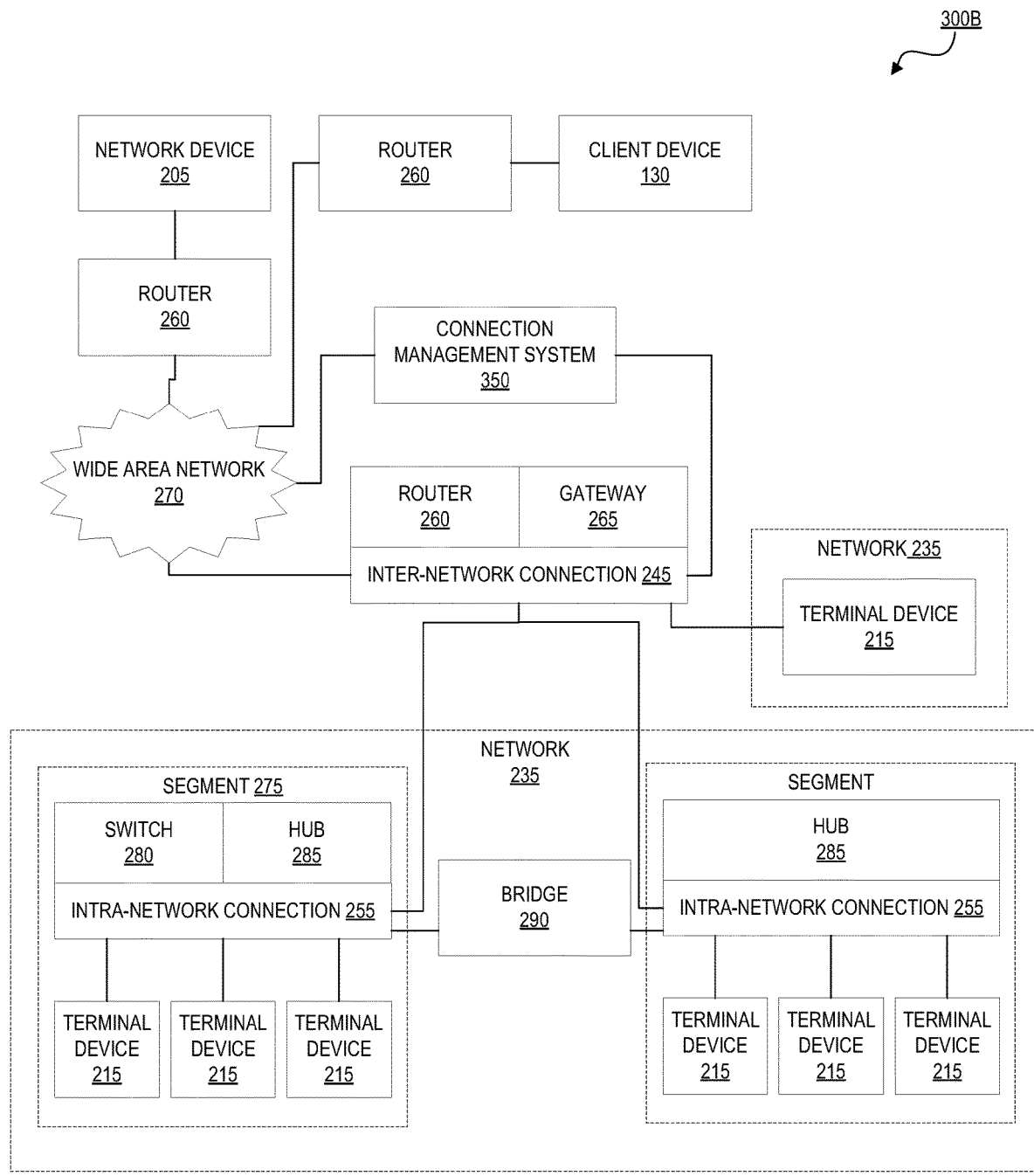
Figure 3C:
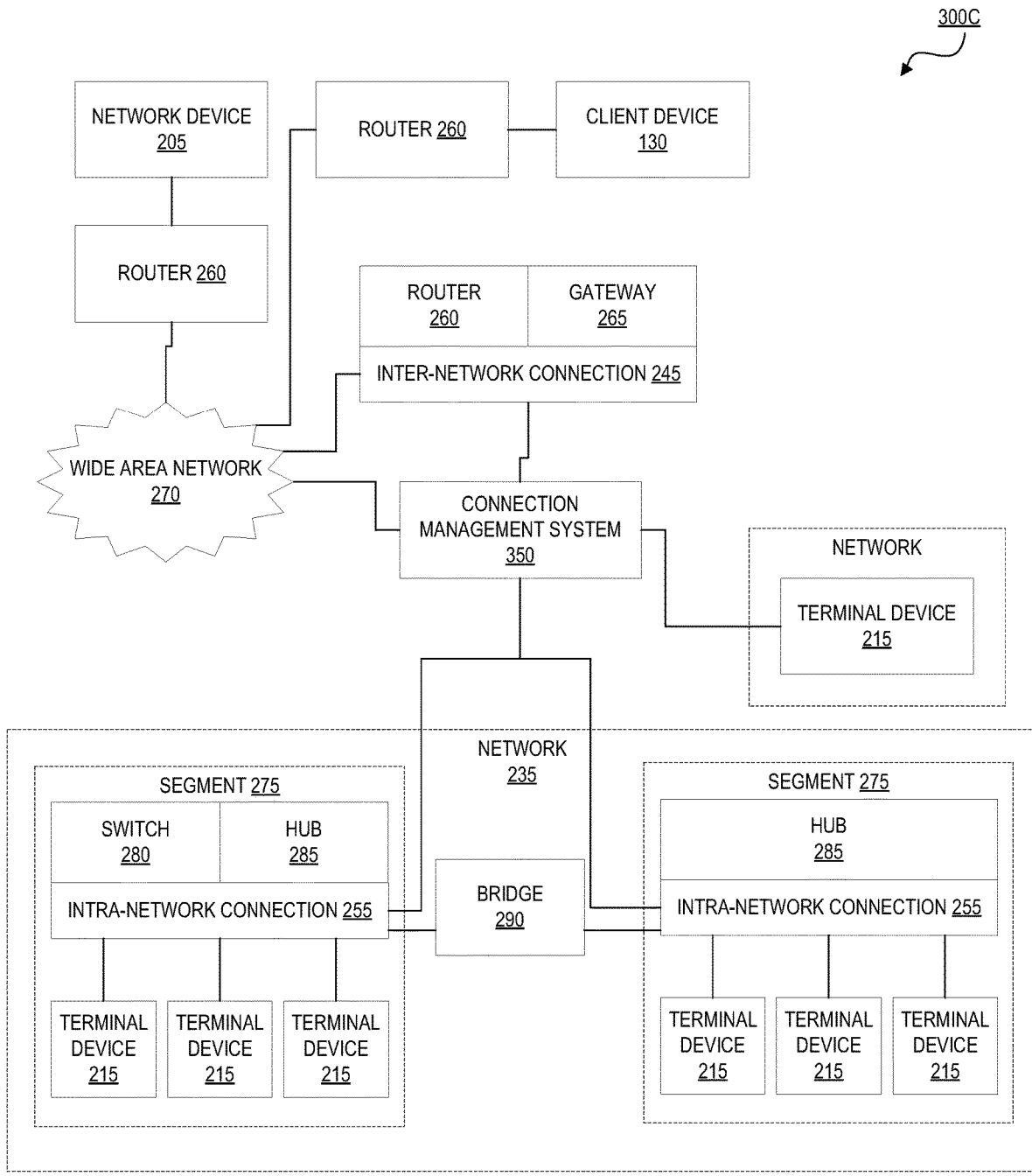

FIGS. 3A-3C show block diagrams of other embodiments of a network interaction system 300a-c that includes a connection management system. Each of the depicted systems 300a-c show only 2 local-area networks 235 for simplicity, though it can be appreciated that embodiments can be extended to expand the number of local-area networks. Each of systems 300A-C include a connection management system 350, which can identify which terminal device is to communicate with network device 205, can establish and manage (e.g., maintain or close) connection channels, can determine whether and when to re-route communications in an exchange, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350a is associated with network device 205 and connection management system 350b is associated with remote server 340). For example, connection management system 350a and/or connection management system 350b can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on.

Connection management system 350b executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, connection management system 350b may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 350 can be configured to serve as a relay and/or destination address. Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or complementary applications (e.g., executing on one or more other components, network devices or remotes servers).

Figure 4:
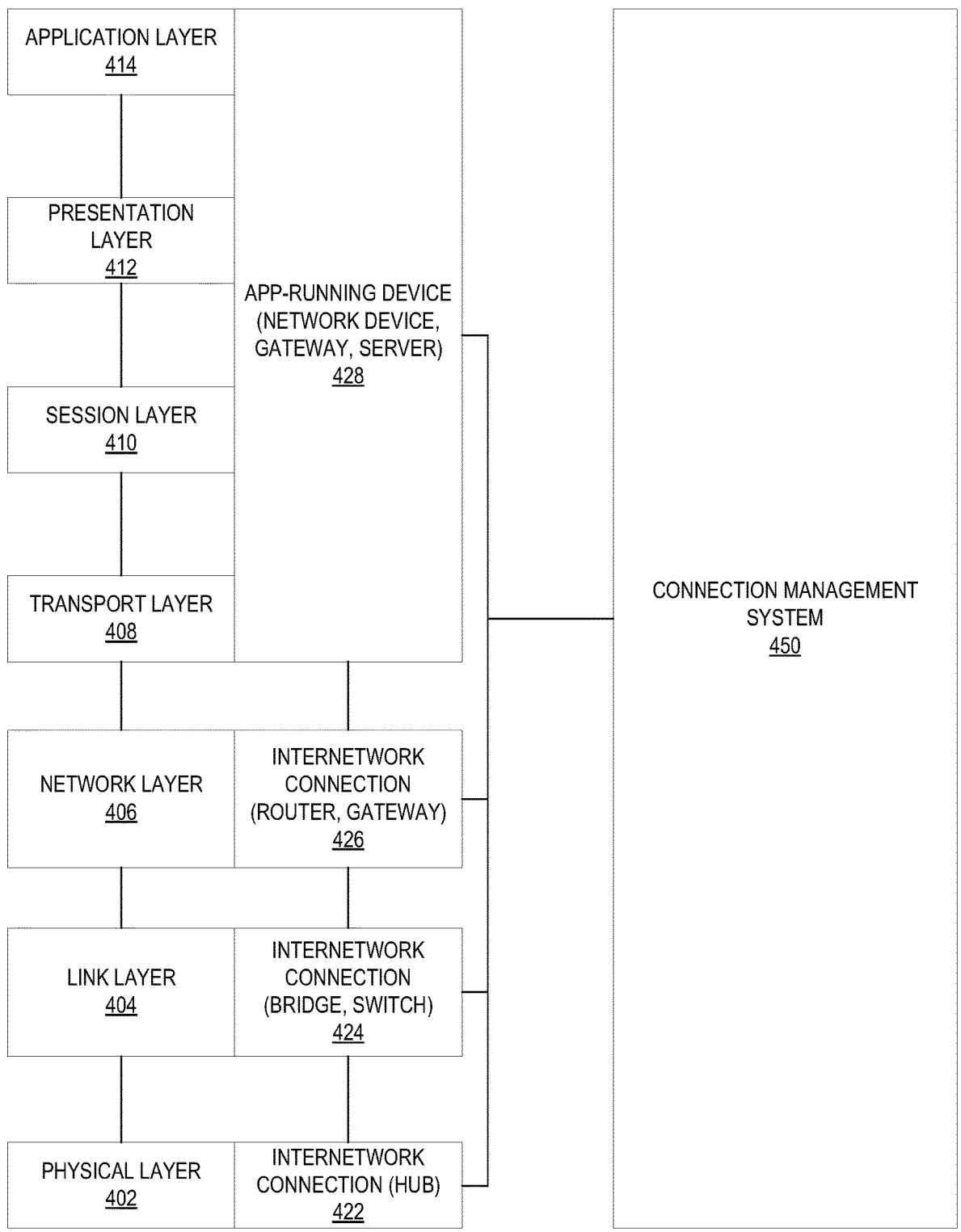
FIG. 4 shows a representation of a protocol-stack mapping of connection components' operation that can be used in accordance with examples described herein.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
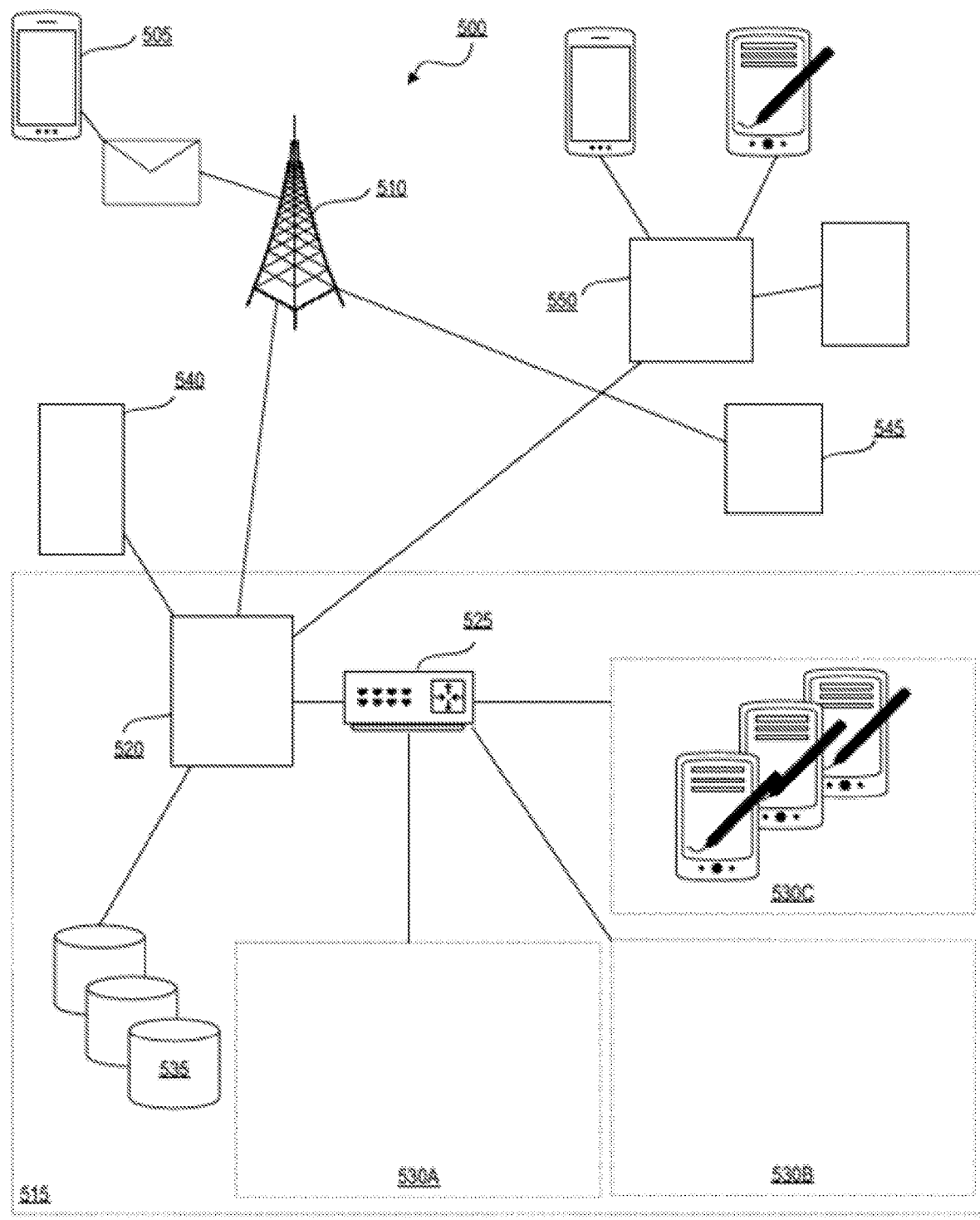
FIG. 5 represents a multi-device communication exchange system that can be used in accordance with examples described herein.

FIG. 5 represents a multi-device communication exchange system 500 according to an embodiment. System 500 includes a network device 505 configured to communicate with a variety of types of terminal devices over a variety of types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530a-c can correspond to a different client. The terminal devices may be geographically co-located or disperse. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may collect, analyze and/or store data from or pertaining to communications, terminal-device operations, client rules, and/or user-associated actions (e.g., online activity) at one or more data stores. Such data may influence communication routing.

Notably, various other devices can further be used to influence communication routing and/or processing. For example, in the depicted instance, connection management system 520 also is connected to a web server 540. Thus, connection management system 520 can retrieve data of interest, such as technical item details, and so on.

Network device 505 may also be connected to a web server (e.g., including a web server 545). In some instances, communication with such a server provided an initial option to initiate a communication exchange with connection management system 520. For example, network device 505 may detect that, while visiting a particular webpage, a communication opportunity is available and such an option can be presented.

One or more elements of communication system 500 can also be connected to a social-networking server 550. Social networking server 550 can aggregate data received from a variety of user devices. Thus, for example, connection management system 520 may be able to estimate a general (or user-specific) behavior of a given user or class of users.

Figure 6:
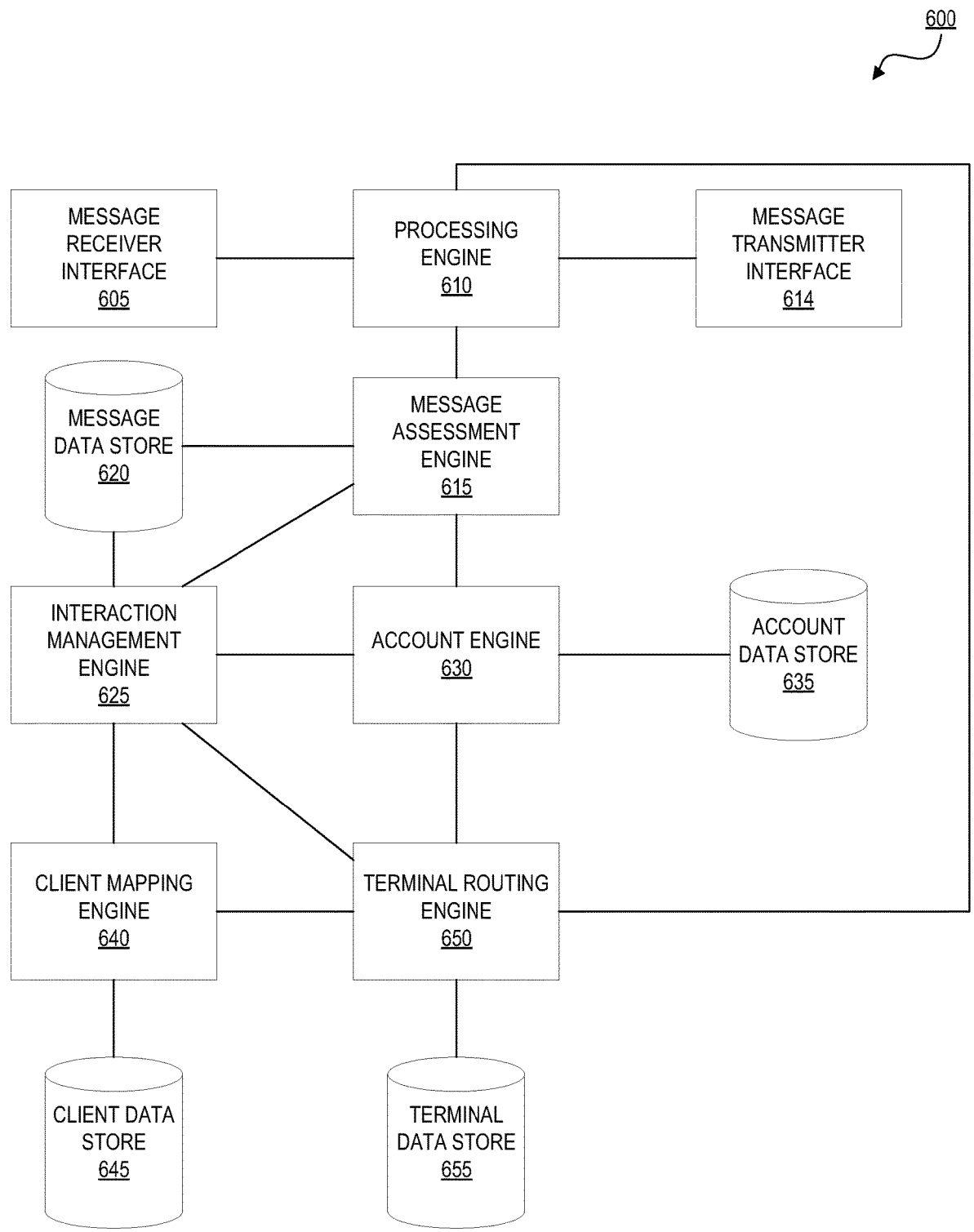
FIG. 6 shows a block diagram of an embodiment of a connection management system that can be used in accordance with examples described herein.

FIG. 6 shows a block diagram of an embodiment of a connection management system 600. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate exchange, which can include a series of messages or message exchange being routed between two devices (e.g., a network device and terminal device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client. To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A message assessment engine 615 may assess the (e.g., extracted or received) message. The assessment can include identifying, for example, one or more categories or tags for the message. Examples of category or tag types can include (for example) topic, sentiment, complexity, and urgency. A difference between categorizing and tagging a message can be that categories can be limited (e.g., according to a predefined set of category options), while tags can be open. A topic can include, for example, a technical issue, a use question, or a request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some instances, message assessment engine 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 615 can store a message, message metric and/or message statistic in a message data store 620. Each message can also be stored in association with other data (e.g., metadata), such as data identifying a corresponding source device, destination device, network device, terminal device, client, one or more categories, one or more stages and/or message-associated statistics). Various components of connection management system 600 (e.g., message assessment engine 615 and/or an interaction management engine 625) can query message data store 620 to retrieve query-responsive messages, message metrics and/or message statistics.

An interaction management engine 625 can determine to which device a communication is to be routed to, how the receiving and transmitting devices are to communicate, and any relevant bots to be used or recommended to an agent as part of a two-way communication. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

Interaction management engine 625 can interact with an account engine 630 in various contexts. For example, account engine 630 may look up an identifier of a network device or terminal device in an account data store 635 to identify an account corresponding to the device. Further, account engine 630 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, a terminal device, an account and a client. Account engine 635 can (in some instances) subsequently notify a user of the channel's existence such that the user can be aware of the agent consistency being availed.

Interaction management engine 625 can further interact with a client mapping engine 640, which can map a communication to one or more clients (and/or associated brands). In some instances, a communication received from a network device itself includes an identifier corresponding to a client (e.g., an identifier of a client, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some instances, a message may not particularly correspond to any client. For example, a message may include a general query. Client mapping engine 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 645 can include identifications of one or more terminal devices (and/or agents) associated with the client. A terminal routing engine 650 can retrieve or collect data pertaining to each of one, more or all such terminal devices (and/or agents) so as to influence routing determinations. For example, terminal routing engine 650 may maintain a terminal data store 655, which can store information such as terminal devices' device types, operating system, communication-type capabilities, installed applications accessories, geographic location and/or identifiers (e.g., IP addresses). Some information can be dynamically updated. For example, information indicating whether a terminal device is available may be dynamically updated based on (for example) a communication from a terminal device (e.g., identifying whether the device is asleep, being turned off/on, non-active/active, or identifying whether input has been received within a time period); a communication routing (e.g., indicative of whether a terminal device is involved in or being assigned to be part of a communication exchange); or a communication from a network device or terminal device indicating that a communication exchange has ended or begun.

It will be appreciated that, in various contexts, being engaged in one or more communication exchanges does not necessarily indicate that a terminal device is not available to engage in another communication exchange. Various factors, such as communication types (e.g., message), client-identified or user-identified target response times, and/or system loads (e.g., generally or with respect to a user) may influence how many exchanges a terminal device may be involved in.

Systems and methods for transferring messaging to automation via a bot during communication sessions with network devices (e.g., operated by users) are provided. A user may use a network device to initiate a conversation with an agent regarding resolution of an issue. The agent may launch a widget on the associated terminal device to accelerate resolution of the user's intent. The user's intent may be automatically identified and a recommended automation to transfer to a bot may be made. Key user information may also be provided, such as order number, account number, and the like. The agent may manually or automatically initiate a transfer to a bot, which allows the agent to provide feedback on the recommendation to transfer. In addition, the agent may use the terminal device to watch the transferred conversation and rescue the conversation if the user begins to appear dissatisfied. The conversation between the user and the bot may appear inline to the conversation with the agent.

In some embodiments, an agent is able to monitor multiple conversations that were transferred to a bot and rescue the conversation if needed. A sentiment score may be utilized to displayed on the terminal device to facilitate priority of rescuing conversations. Assist features utilizing artificial intelligence such as "intent hint" and "recommended automation" may be shown as actionable inline suggestions within the conversation window. The feedback may be used and analyzed in aggregate to apply data science as training input to models.

In some implementations, bots can be configured to autonomously communicate with network devices. Further, bots can be configured for a specific capability. Examples of capabilities can include updating database records, providing updates to users, providing additional data about the user to agents, determining a user's intent and routing the user to a destination system based on the intent, predicting or suggesting responses to agents communicating with users, escalating communication sessions to include one or more additional bots or agents, and other suitable capabilities. In some implementations, while a bot is communicating with a network device (e.g., operated by the user) during a communication session (e.g., using a chat-enabled interface), a communication server can automatically and dynamically determine to switch the bot with a terminal device. For example, bots can communicate with users about certain tasks (e.g., updating a database record associated with a user), whereas, terminal devices can communicate with users about more difficult tasks (e.g., communicating using a communication channel to solve a technical issue).

In some implementations, determining whether to switch to automation during a communication session can be based on an analysis of one or more characteristics of the messages in a communication session. Further, a dynamic sentiment parameter can be generated to represent a sentiment of messages, conversations, entities, agents, and so on. For example, in cases where the dynamic sentiment parameter indicates that the user is frustrated with the bot, the system can automatically switch the bot with a terminal device so that a live agent can communicate with the user. In some examples, determining whether to switch between the bots and terminal devices can be performed without a prompt from a user. The determination can be performed automatically at the communication server based any number of factors, including characteristics of the current messages in the communication session (e.g., chat), characteristics of previous messages transmitted by the user in previous communication sessions, a trajectory of a characteristic (e.g., a sentiment) over multiple messages in a conversation, or additional information associated with the user (e.g., profile information, preference information, and other suitable information associated with the user).

In conjunction with the above described functions, interaction management engine 625 can, in some examples, query bots to have the bots return a confidence score indicating relevance of the bot to a particular set of input data. The query can occur with the above described sentiment or intent analysis, or can be independent. In some examples, the query can be local, with the bots operating on a shared device or system with the interaction management engine 625. In some examples, the bots can be operated remotely, such as on an independent server or on a remote cloud-based system. In such examples, the query is associated with transmission of a request for a confidence score the remote system. The interaction management engine 625 can then manage assessment of the confidence scores, including management of a calibration or mapping operation as described further below.

Figure 7:
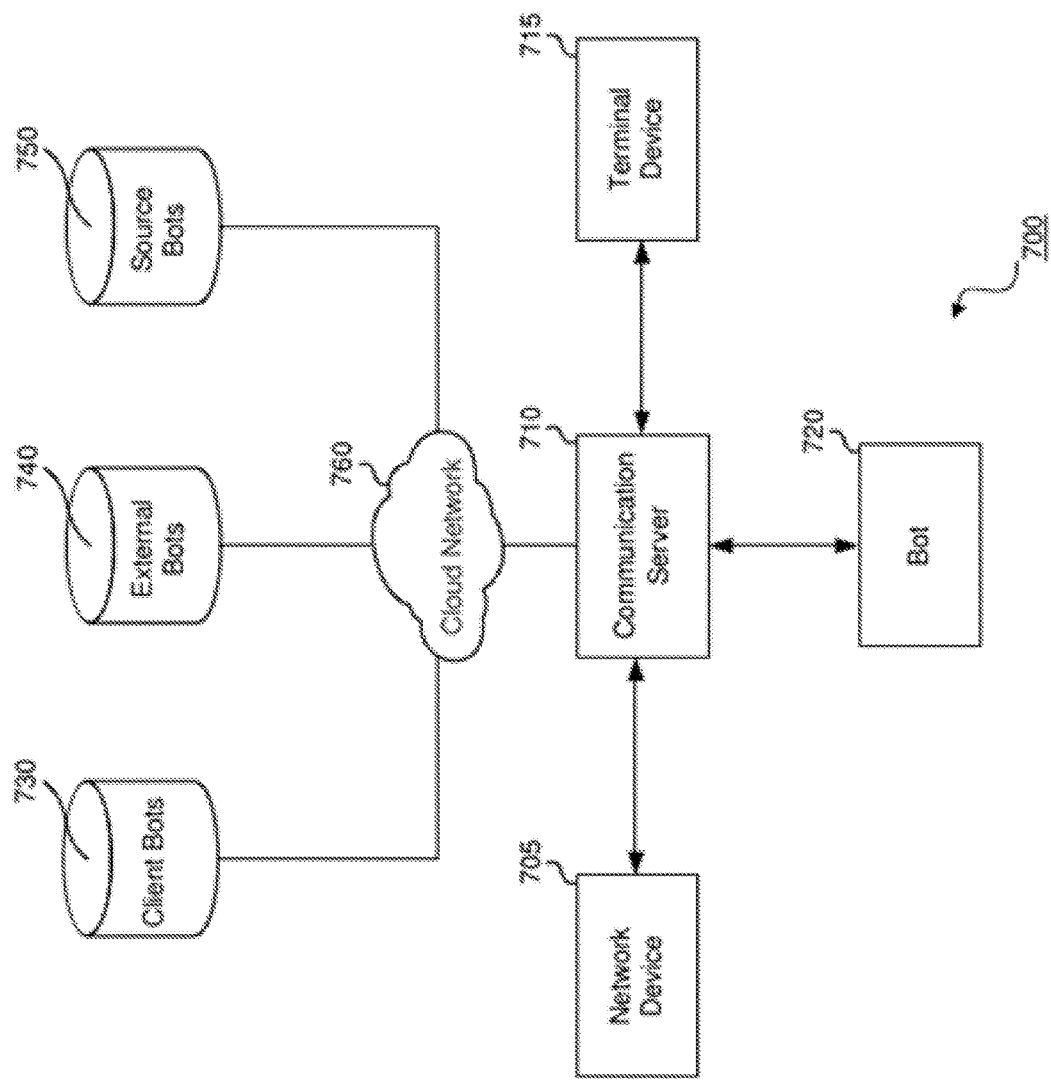
FIG. 7 shows a block diagram of a network environment for dynamically switching between bots and terminal devices during communication sessions in accordance with examples described herein.

FIG. 7 shows a block diagram of a network environment for dynamically switching between bots and terminal devices during communication sessions. In some implementations, network environment 700 can include network device 705, communication server 710, terminal device 715, and bot 720. Communication server 710 can be a server with one or more processors with at least one storage device, and can be configured to perform methods and techniques described herein. For example, communication server 710 can manage communication sessions between network devices (e.g., operated by users) and terminal devices (e.g., operated by agents). Communication server 710 can establish a communication channel between network device 705 and terminal device 715 so that network device 705 and terminal device 715 can communicate with each other during a communication session. A communication session can facilitate the exchange of one or more messages between network device 705 and terminal device 715. The present disclosure is not limited to the exchange of messages during a communication session. Other forms of communication can be facilitated by the communication session, for example, video communication (e.g., a video feed) and audio communication (e.g., a Voice-Over-IP connection).

In some implementations, communication server 710 can establish a communication channel between network device 705 and bot 720. Bot 720 can be code that, when executed, is configured to autonomously communicate with network device 705. For example, bot 720 can be a bot that automatically generates messages to initiate conversations with the user associated with network device 705 and/or to automatically respond to messages from network device 705. In addition, communication server 710 can be associated with a platform. Clients (e.g., an external system to the platform) can deploy different types of bots in their internal communication systems using the platform. In some examples, clients can use their own bots in the platform, which enables clients to implement the methods and techniques described herein into their internal communication systems.

In some implementations, bots can be defined by one or more sources. For example, data store 730 can store code representing bots that are defined (e.g., created or coded) by clients of the communication server. For example, a client that has defined its own bots can load the bots to the communication server 710. The bots defined by clients can be stored in client bot data store 730. Data store 740 can store code representing bots that are defined by third-party systems. For example, a third-party system can include an independent software vendor. Data store 750 can store code representing bots that are defined by an entity associated with communication server 710. For example, bots that are coded by the entity can be loaded to or accessible by communication server 710, so that the bots can be executed and autonomously communicate with users. In some implementations, communication server 710 can access bots stored in data store 730, data store 740, and/or data store 750 using cloud network 760. Cloud network 760 may be any network, and can include an open network, such as the Internet, personal area network, local area network (LAN), campus area network (CAN), metropolitan area network (MAN), wide area network (WAN), wireless local area network (WLAN), a private network, such as an intranet, extranet, or other backbone.

In addition, terminal device 715 can be operated by an agent. Terminal device 715 can be any portable (e.g., mobile phone, tablet, laptop) or non-portable device (e.g., electronic kiosk, desktop computer, etc.). In some instances, the agent can access a website using a browser that is running on terminal device 715. For example, the website can include a console or platform that is running on the browser of terminal device 715. The agent can be logged into the platform using the browser. One or more login credentials (e.g., username, password, and the like) can be used to authenticate the agent's identity before allowing the agent to gain access to the console or web applications included in the console. Examples of a console can include a platform that includes one or more APIs (application programming interfaces), a dashboard including one or more functions, a web-hosted application running on a web browser (without the need for downloading plug-ins) that is capable of establishing or joining a communication session, and other suitable interfaces. Further, the console can include one or more web applications or functions that can be executed. The web applications or functions can be executed at the browser, at communication server 710, a local server, a remote server, or other suitable computing device. For example, the web applications, native applications, or functions can enable an agent to communicate with a user, and to view communications between the user and one or more bots.

In some implementations, communication server 710 can recommend automations that cause a conversation to dynamically switch between bot 720 and terminal device 715 during a particular communication session. Such automations or support can be selected from a set of bots available to communication server 710. In some examples, communication server 710 can query any number of bots such as client bots 730, external bots 740, or source bots 750 in real-time as input data from a two-way communication is analyzed. The bot queries result in communication server 710 receiving confidence scores from the queried bots. When the confidence scores are available at communication server 710 (e.g., received from a remote device executing the bots 730, 740, and/or 750 and/or scores are generated locally), local mapping calibration is used to modify the confidence scores, and the bot selected to be used in facilitating a two-way communication is selected based on the modified confidence scores. The modifications can include filters to reject certain bots from consideration based on threshold confidence values, or score modifications based on historical feedback.

In some examples, communication server 710 can facilitate a communication session between network device 705 and selected bot 720. Bot 720 can be configured to autonomously communicate with network device 705 by exchanging one or more messages with the network device 705 during the communication session. Communication server 710 can dynamically determine whether to switch bot 720 with terminal device 715 (or in some cases, vice versa) so that a live agent can communicate with network device 705, instead of bot 720. In some implementations, the switching can be performed without a prompt from the network device 705 or terminal device 715. For example, the switching can be based on message parameters (e.g., scores representing sentiment of a message or series of messages) of the messages exchanged between the network device 705 and the bot 720, without prompting the network device 705 to request a terminal device.

In some implementations, the communication server 710 utilizes one or more machine learning models or artificial intelligence to automatically determine whether to switch bot 720 with terminal device 715 (or in some cases, vice versa). For instance, messages exchanged between the network device 705 and the bot 720 may be used as input by the one or more machine learning models or artificial intelligence to generate an output. The output may specify whether the communication session between the network device 705 and the bot 720 is to be switched to a live agent or is to be maintained. The machine learning models may be trained using supervised learning techniques. For instance, a dataset of input messages and corresponding outputs specifying the appropriate responding entity (e.g., live agent or bot) can be selected for training of the machine learning models. In some examples, the input messages can be obtained from administrators of the communication server 710, users of the network device 705 and other network devices that may interact with the communication server 710, and/or other sources associated with the communication server 710. The machine learning models or artificial intelligence may be evaluated to determine, based on the input messages supplied to the machine learning models or artificial intelligence, whether the machine learning models or artificial intelligence are providing useful outputs that can be used to determine whether the corresponding communication sessions are to be processed by a live agent or a bot. Based on this evaluation, the machine learning models or artificial intelligence may be modified (e.g., one or more parameters or variables may be updated) to increase the likelihood of the machine learning models or artificial intelligence generating the desired results.

In some implementations, the one or more machine learning models or artificial intelligence may generate, as output, the scores representing sentiment of an input message or series of messages. The communication server 710 may determine whether the resulting score exceeds a threshold value corresponding to allocation of a communication session to a bot 720 or live agent. For instance, if the score exceeds the threshold value, the communication server 710 may determine that the communication session is best suited for a bot 720. Thus, if the communication session is currently between a network device 705 and a terminal device 715 (e.g., live agent), the communication server 710 may automatically transition the communication session from the terminal device 715 to a bot 720 or indicate, to the live agent operating the terminal device 715, that the bot 720 may handle the communication session with the network device 705. Alternatively, if the score does not exceed this threshold value, the communication server 710 may determine that the communication session is best suited for a terminal device 715 (e.g., live agent). In this example, if the communication session is currently between a network device 705 and a bot 720, the communication server 710 may automatically transition the communication session from the bot 720 to a terminal device 715. In some instances, if the score does not exceed this threshold value, the communication server 710 may indicate, to the live agent operating the terminal device 715, that it should intervene in the communication session. It should be noted that the threshold and scores described above are meant to be illustrative and alternative thresholds and scoring mechanisms may be implemented to determine whether to utilize a bot 720 or terminal device 715 for a particular communication session with a network device 705.

In some instances, the communication server 710 may implement a dynamic set of rules or policies that may be used to determine a relevant action for a given communication session with the network device 705. The set of rules may be provided by an administrator or other authorized entity associated with the communication server 710 or may be generated using one or more machine learning algorithms or artificial intelligence as described above. As an illustrative example, the communication server 710 may evaluate the conversational progress between the network device 705 and either the bot 720 or terminal device 715 to determine, based on the set of rules or policies, whether to invoke alternative actions (e.g., such as transitioning the communication session from the bot 720 to the terminal device 715 or vice versa). For example, if the communication server 710 determines, based on obtained messages exchanged during the communication session, that there is a flux in the confidence score for the bot 720 and/or in the sentiment score for the user of the network device 705, the communication server 710 may determine, based on the set of rules or policies relevant to the communication session, an appropriate action. This may include transitioning the communication session from a bot 720 to a terminal device 715, transmitting a notification to the terminal device 715 indicating that it is to intervene in the communication session, and the like. Once the relevant action is taken, the communication server 710 may continue to monitor subsequent messages exchanged during the communication session to evaluate the impact of the action taken subject to the set of rules or policies. Based on feedback garnered from these subsequent messages and/or from the user and live agent post-session, the communication server 710 may update the machine learning algorithms or artificial intelligence utilized to generate the set of rules or policies. These updates may result in the dynamic creation or modification of the set of rules or policies to provide improved recommendations for actions to be taken during a communication session. If the set of rules or policies are defined by an administrator or other authorized entity associated with the communication server 710, the communication server 710 may provide the obtained feedback and a set of recommendations for updating the set of rules or policies to the administrator or other authorized entity.

In some implementations, communication server 710 can determine to switch between bot 720 and terminal device 715 automatically based on characteristics of the messages exchanged between the bot 720 and the network device 705. In some instances, analyzing the text of a message to determine the characteristic (e.g., the message parameter) can include an analysis of textual or non-textual attributes associated with the message. For example, communication server 710 can extract one or more lines of text included in the message from network device 705. Communication server 710 can identify whether the one or more lines of text include an anchor. Examples of an anchor include a string of text associated with a polarity (e.g., sentiment or intent, the word "frustrated" corresponding to a negative polarity or frustrated polarity, the word "happy" corresponding to a positive polarity, and so on). For example, a term "dispute" for one client can be negative, but can be neutral or positive for a second client. In some instances, anchors can be dynamically determined using supervised machine learning techniques. For example, one or more clustering algorithms can be executed on stored messages to find patterns within the stored messages. The clustered messages can be further filtered and evaluated to determine the anchor. Further, one or more words near the identified anchor can be parsed for amplifiers. An example of an amplifier is a term that increases or decreases an intensity associated with the polarity of the anchor, such as "really," "not really," "kind of," and so on. The characteristic can include, for example, the speed of typing, the number of special characters used in the message (e.g., exclamation points, question marks, and so on), a semantic analysis of a message (e.g., by identifying keywords, sentence structures, repeated words, punctuation characters and/or non-article words); user input (e.g., having selected one or more categories); and/or message-associated statistics (e.g., response latency).

As a non-limiting example, the message parameter can be a numerical value that indicates the high intensity of the negative polarity (e.g., a message parameter of 20 on a scale of 0-100, with lower numbers indicating a negative polarity and higher numbers indicating a positive polarity). An algorithm can be used to calculate the message parameter. For example, the algorithm may be based on supervised machine learning techniques. In a further example, if the term "kind of" is near the anchor "don't like" (e.g., as in the sentence "I kind of don't like"), the term "kind of" may be identified as an amplifier term that indicates a medium intensity of the negative polarity. In this case, a message parameter can be generated based on the identification of the medium intensity of the negative polarity. As a non-limiting example, the message parameter can be a numerical value that indicates the medium intensity of the negative polarity (e.g., a message parameter of 40, as opposed to the message parameter of 20). In some instances, the message parameter can be used to determine which secondary queue is to store the communication.

In some implementations, the characteristic of a message can be the sentiment associated with the message. The message parameter can represent the sentiment of the message. For example, if the sentiment of the message is happy, the message parameter can be a certain value or range of values, whereas, if the sentiment of the message is angry, the message parameter can be another value or range of values. Determining whether to switch between the bots and the terminal device can be based on the message parameter, which is continuously and automatically updated with each new message received at communication server 710.

In some implementations, if the communication server 710 determines that a conversation is to be switched from a bot 720 to a terminal device (e.g., live agent), the communication server 710 identifies which terminal device (e.g., agent) is more likely to positively resolve the technical issue presented by the user of the network device 705. For instance, based on the characteristics of the messages received from the network device 705 and the technical issue expressed by the user of the network device 705 via its messages, the communication server 710 may identify a terminal device associated with an agent that is likely to address the technical issue while providing a higher likelihood of a positive interaction with the user.

To identify which agent is best suited for responding to a user for a technical issue, the communication server 710 may use the characteristics of the messages received from the network device 705 and the technical issue expressed by the user of the network device 705 as input to a machine learning model or artificial intelligence algorithm configured to provide, as output, selection of a particular agent. The machine learning model or artificial intelligence algorithm may be trained using feedback associated with previously conducted conversations between users and live agents. This feedback may be used to identify certain characteristics for each agent. These characteristics may include, but are not limited to, areas of expertise associated with technical issues, responsiveness to particular sentiments (e.g., ability to reduce user frustration or anger, etc.), response latency, user satisfaction rating or score, and the like. If an agent is required to intervene in a conversation between a network device 705 and a bot 720, the communication server 710 may use the machine learning model or artificial intelligence algorithm to select a particular agent that may intervene in the conversation and provide an increased likelihood of a positive user experience.

In some implementations, the communication server 710 uses feedback from the network device 705 to train or update the machine learning model or artificial intelligence algorithm used to select an agent for intervention in a conversation between a network device and a bot. For instance, if the network device 705 provides feedback indicating a negative experience with the selected agent, the communication server 710 may update the machine learning model or artificial intelligence algorithm to reduce the likelihood of the agent's selection for a conversation having identical or similar characteristics to the conversation associated with the received feedback. Alternatively, if the network device 705 provides feedback indicating a positive experience with the selected agent, the communication server 710 may update the machine learning model or artificial intelligence algorithm to further reinforce the agent's ability to positively address identical or similar conversations.

In some implementations, communication server 710 may recommend or predict responses to messages received from network device 705. For example, communication server 710 can include a message recommendation system, which can evaluate messages received from network device 705 and use a machine-learning model to recommend responses to those received messages. The message recommendation system can display a set of recommended messages on terminal device 715 to assist the agent in communicating with network device 705.

Figure 8:
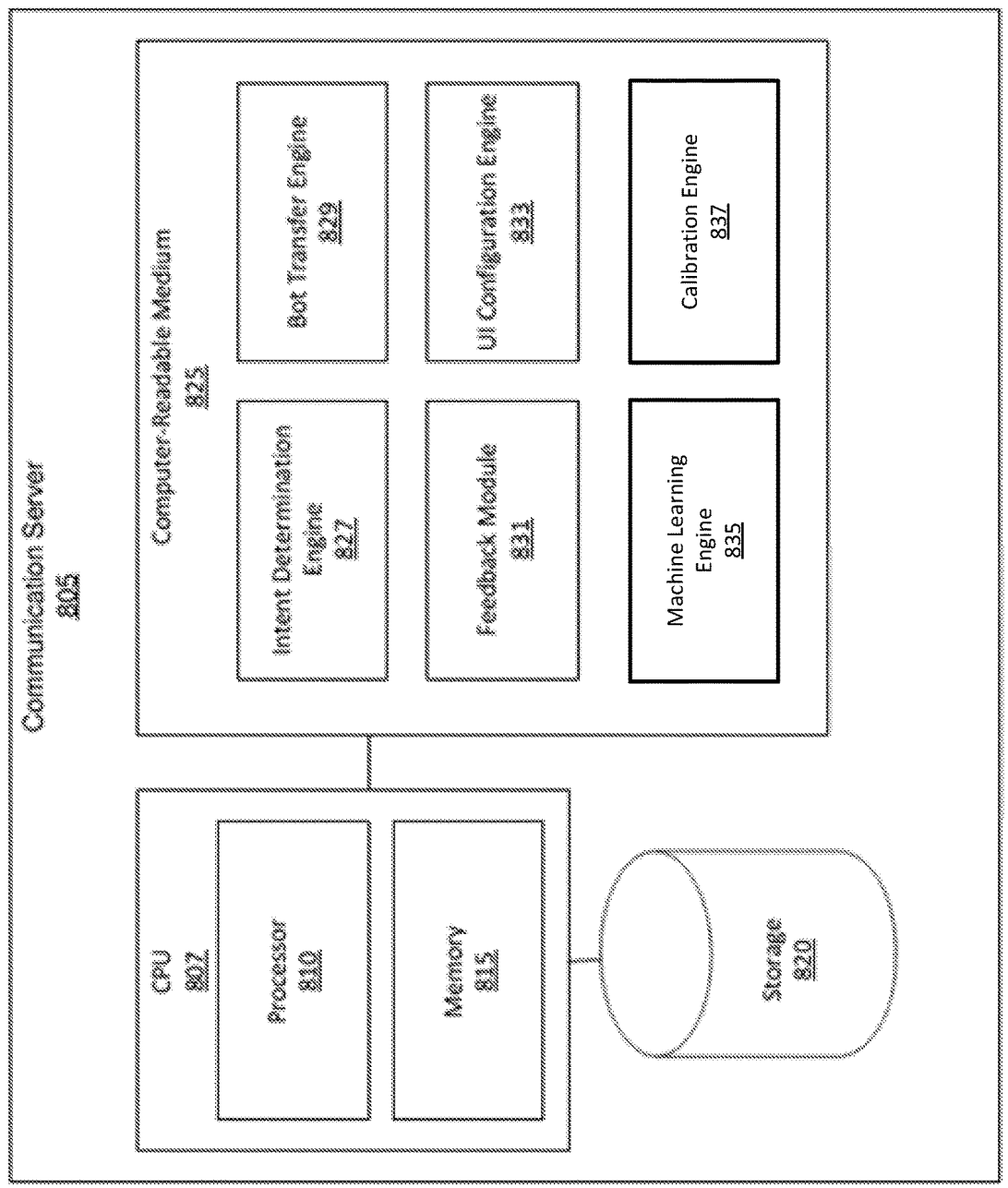
FIG. 8 shows a block diagram representing a communication that can be used in accordance with examples described herein.

FIG. 8 shows a block diagram of a communication server 805 according to some embodiments. The communication server 805 may illustrate the internal components of the communication server 710 of FIG. 7. The communication server 805 may include a central processing unit (CPU) 807, including a processor 810 and memory 815. The communication server 805 may further include storage 820.

The CPU 807 may be coupled to a computer-readable medium 825. The computer-readable medium 805 may have any number of modules and engines. Although five modules and engines are illustrated, it is contemplated that fewer or greater modules or engines may be implemented in the computer-readable medium 825 to perform the functions described herein. As shown in FIG. 8, the computer-readable medium 825 may include an intent determination engine 827, a bot transfer engine 829, a feedback module 831, a user interface (UI) configuration engine 833, and a machine learning engine 835.

The intent determination engine 827 may be configured to, in conjunction with the processor 810, receive a request for a conversation. The request may be received from a network device operated by a user. The request may be received at a terminal device operated by an agent, for example. The intent determination engine 827 may further be configured to, in conjunction with the processor 810, determine an intent for the conversation. The intent may be determined from the request. For example, the request may state, "I want my order status." The intent may be extracted from the request as "order_status".

Calibration engine 837 can be configured to manage selection of bots or other resources during a two-way communication session as described herein. For example, using an intent from intent determination engine 827, a subset of bots available to communication server 805 and relevant to an identified intent can be identified. An initial query to the subset of bots can result in a set of confidence scores received from the subset of bots. Calibration engine 837 can then use mapping data generated with machine learning engine 835 to provide a real-time selection of a bot or resource to be used in the two-way communication session. For example, if a system parses input data to identify "order status" as the intent, the system may identify five available bots relevant to that intent. The bots can return respective confidence scores of 0.9, 0.85, 0.6, 0.5, and 0.5. Rather than selecting the bot with the highest returned confidence score, the system can apply a dynamic calibration mapping to these scores based on feedback from previous two-way communications. The mapping can, for example, result in the 0.9 confidence score being adjusted to a mapped score of 0.78, and the 0.85 score being adjusted to a mapped score of 0.84. If mapped scores for the remaining bots are lower than this, then the bot with the confidence score of 0.84 and the mapped score of 0.84 can be selected for use.

During use of this bot, a participant in the two-way communication (e.g., either a customer or agent) may provide feedback on the bot. Positive feedback can result in the adjustment being made more positive (e.g., a next mapping may be from 0.85 to 0.85 instead of to 0.84 for the same or similar input data). Negative feedback can result in the adjustment being made more negative (e.g., a next mapping may be from 0.85 to 0.83 instead of 0.84). Negative feedback can additionally trigger the dynamic selection of a different bot in real-time for the current two-way communication, using a combination of calibration engine 837 and bot transfer engine 829.

The bot transfer engine 829 may be configured to, in conjunction with the processor 810 and calibration engine 837, automatically provide one or more options to dynamically select, change, or transfer the conversation to a type of bot from a set of different types of bots. For instance, a two-way communication may involve an agent and a customer sending communications back-and-forth. During such communications, analysis of the communications can involve input data that is sent to bots for a confidence score. The input data can be identified by NLU processing triggers and intent analysis or by a request from an agent. When confidence scores above a threshold are generated, an option to transfer the conversation from the agent to a type of bot may be presented to the agent. When this option is selected by the agent, the conversation with a bot of the corresponding type may be facilitated. The conversation may be transferred from the terminal device operated by the agent to the bot, either manually or automatically. Automatic transfer may occur, for example, for an intent with a high confidence of resolution by the particular type of bot, as determined from machine learning techniques or past experiences. In some implementations, if the bot transfer engine 829 determines, with high confidence, that an intent may be resolved by a particular type of bot, the bot transfer engine 824 may automatically transfer the conversation from the terminal device operated by the agent to a bot of the particular type without providing options to transfer the conversation to a bot of the particular type. This may obviate the need for manual selection of an option to facilitate the conversation with the bot. In some implementations, the bot transfer agent 829 may utilize a confidence threshold to determine whether to present the aforementioned one or more options to transfer the conversation to a type of bot. For example, if the bot transfer engine 829 determines that a particular intent has a high confidence score for resolution by a type of bot, and the high confidence score exceeds the confidence threshold, the bot transfer engine 829 may automatically transfer the conversation to a bot of this particular type without presenting an option to transfer the conversation to the bot. Alternatively, if the bot transfer engine 829 determines that a particular intent has a confidence score for resolution by a type of bot that does not exceed the confidence threshold, the bot transfer engine 829 may present the one or more options to transfer the conversation to the bot. The operations of bot transfer engine 829 to use different bots within a communication can occur simultaneously with communication server 805 management of other aspects of a communication. For example, while a customer is typing or transmitting a response as part of a communication, bot transfer engine can simultaneously be processing previous data and transferring the communication to a new bot or initiating execution of a new bot as part of the communication. New communications from a customer can be analyzed in real-time to dynamically inform transfer decisions made by bot transfer engine 829, and transfer decisions can occur at the same time that a current bot is performing operations for a communication. A bot can thus be executing operations for a communication (e.g., generating communication text or other communication responses), while the bot transfer engine 829 is selecting a new bot. In some aspects, after a new bot is selected by bot transfer engine 829, the new bot can begin analysis of communication data to formulate a subsequent output or response as part of a two-way communication while the current bot is finishing a final communication prior to a transfer to a new bot. In some aspects, the bot transfer engine 829 can determine that multiple bots should operate simultaneously as part of a communication, and the bots can be configured to communicate serially with a customer while performing analysis operations in parallel. In such operations, one bot can use processing resources the assist with a communication at the same time that a different bot is also using processing resources to assist with the same communication. The bot transfer engine 829 can then manage outputs from the different bot to be communicated to the customer. Additionally, as described herein, any number of customers can interact with a communication server 805 at the same time, so that bot transfer engine(s) 829 can operate to assist bot selection and use for any number of two-way communications with customers at the same time.

In some instances, the bot transfer engine 829 may identify one or more types of bots based on the intent determined from the request for a conversation. For example, the bot transfer engine 829, may implement a confidence score algorithm that is used to calculate a confidence score corresponding to the likelihood or probability of the different types of bots producing a satisfactory response to a given intent. A confidence score may be a percentage or other value where the lower the percentage or value, the less likely the response is a good prediction for an incoming message, and the higher the percentage, the more likely the response is a good prediction for an incoming message. If the user has expressed dissatisfaction with regard to the conversation with a particular type of bot, the intelligent routing system may update the confidence score algorithm such that, for identical or similar intents, the particular type of bot is assigned a lower confidence score, thereby serving as an indication that the identical or similar intents are more likely to be handled properly by a terminal device (e.g., live agent) or another type of bot. As another non-limiting example, if the user has expressed satisfaction with regard to the conversation with a particular type of bot, the intelligent routing system may update the confidence score algorithm such that, for identical or similar intents, the particular type of bot is assigned an equal or greater confidence score, thereby serving as an indication that the identical or similar intents are more likely to be handled properly by the particular type of bot.

In some implementations, the bot transfer engine 829 may dynamically provide one or more options to transfer the conversation to a type of bot from a terminal device operated by an agent. For instance, via an interface that may be displayed on a terminal device to recommend bots and receive feedback, the bot transfer engine 829 may provide an agent with one or more recommendations for types of bots that may be able to handle the identified intent. Each recommendation may include a corresponding confidence score, which indicates a likelihood that the intent is resolvable using the corresponding type of bot. In addition to providing a confidence score for each type of bot that may be capable of handling the request, the bot transfer engine 829, via the interface, may provide an agent with an option to transfer a communication session or conversation to the type of bot. If the agent selects an option to transfer the communication session to a particular type of bot, the bot transfer engine 829 may transfer the communication session to a bot of this particular type. The bot transfer engine 829 may select the bot of the particular type based on one or more factors. For instance, the bot transfer engine 829 may select a bot of the particular type that has sufficient bandwidth to partake in the communication session with the user that submitted the request. The bot transfer engine 829 may additionally, or alternatively, select a bot of the particular type based on one or more characteristics of the user. For instance, the bot transfer engine 829 may select a bot of the particular type that is configured to communicate in a language of the user.

In some implementations, the bot transfer engine 829 may further provide an agent with an option to provide feedback with regard to each recommendation for transferring a conversation to a type of bot. For instance, if an agent determines that a particular recommendation to transfer the conversation to a particular type of bot is improper (e.g., the type of bot is not capable of handling the identified intent, the incorrect intent was identified, etc.), the bot transfer engine 824 may use this feedback to train or otherwise update the machine learning algorithms or artificial intelligence utilized to calculate confidence scores and generate recommendations based on the confidence scores for the different types of bots for a given intent and/or similar intents. This may result in a lower confidence score being assigned to the type of bot by the machine learning algorithms or artificial intelligence for an identical or similar intent. Alternatively, if the agent selects a particular type of bot to which a communication session is to be transferred, the bot transfer engine 829 may use this selection as an indication of positive feedback with regard to its recommendation to utilize the particular type of bot. This feedback may be used to train or otherwise update the machine learning algorithms or artificial intelligence described above to further validate the confidence score and recommendations for use of the particular type of bot for identical or similar intents.

In some implementations, if the agent rejects a particular recommendation to transfer the conversation to a particular type of bot, the bot transfer engine 829 may use the machine learning algorithms or artificial intelligence to generate one or more new recommendations for transferring the conversation to other types of bots based on the identified intent. As noted above, if an agent rejects a particular recommendation to transfer the conversation to a particular type of bot, the bot transfer engine 829 may use this feedback to train or otherwise update the machine learning algorithms or artificial intelligence utilized to calculate confidence scores and generate recommendations based on the confidence scores for the different types of bots for a given intent and/or similar intents. The bot transfer engine 829 may use the updated machine learning algorithms or artificial intelligence to provide new recommendations to the agent for the identified intent. Thus, the bot transfer engine 829 may dynamically and continuously provide an agent with recommendations for transferring a conversation to different types of bots based on the intent and the confidence scores for these different types of bots as calculated using the machine learning algorithms or artificial intelligence.

Different types of bots may be capable of handling certain intents in an automated fashion. For example, for the intent "order_status", an order status bot may be capable of pulling order information using a provided order number, customer name, customer e-mail address, IP address, and/or the like. Once the order information is determined, an order status may be ascertained by the order status bot and provided back to the user in the conversation. As another example, for the intent "payment_status", a payment status bot may be capable of pulling billing information using a provided account number, customer name, customer e-mail address, IP address, and/or the like. Further, using the billing information, a payment status bot may determine whether the customer has submitted a payment, whether a submitted payment has been processed, and the like. Other types of bots may be capable of handling more complex technical issues (e.g., troubleshooting hardware or software issues, addressing fraud reports, etc.).

In some embodiments, the conversation between the network device and a bot may be displayed at the terminal device to allow an agent operating the terminal device to intervene in the conversation. The agent may decide to intervene in the conversation (or the conversation may be automatically transferred back to the terminal device) based on a calculated sentiment score of the user's satisfaction with the conversation. For example, a threshold may exist for which the sentiment score should be above if the user is satisfied with the conversation. If the sentiment score is below a threshold, the conversation may be manually or automatically transferred back to the terminal device.

The sentiment score may be calculated by the machine learning engine 835, which may be configured to utilize messages exchanged during the conversation as input to generate the sentiment score. The machine learning engine 835 may utilize one or more machine learning models that are trained using supervised learning techniques. For instance, a dataset of input messages and corresponding sentiments and sentiment scores can be selected for training of the machine learning models. In some examples, the input messages can be obtained from administrators of the communication server 805, users, agents, and other sources. The one or more machine learning models may be evaluated to determine, based on the input messages supplied to the one or more machine learning models, whether the one or more machine learning models are providing useful outputs that can be used to determine the sentiment and corresponding sentiment score for a conversation. Based on this evaluation, the one or more machine learning may be modified (e.g., one or more parameters or variables may be updated) to increase the likelihood of the one or more machine learning models generating the desired results.

In some instances, the one or more machine learning models may utilize one or more clustering algorithms to determine a sentiment for a particular conversation between a network device and a bot. For example, the machine learning engine 835 may extract messages exchanged during a conversation between the network device and a bot to identify an anchor or other string of text that may be associated with a polarity. The machine learning engine 835 may determine whether the extracted messages correspond to a particular cluster associated with a known sentiment. The cluster may also be associated with or otherwise used to determine a sentiment score of the user's satisfaction with the conversation. For example, each cluster, in addition to corresponding to a particular sentiment, may be associated with a particular score that may denote a polarity, as described above.

In some implementations, the conversation between the network device and the bot may be transferred automatically to the terminal device without requiring the agent operating the terminal device to evaluate the conversation and manually intervene in the conversation. For instance, if the sentiment score for a particular conversation is below a sentiment score threshold, the bot transfer engine 829 may automatically transfer the conversation from the bot to a terminal device to cause a live agent to intervene in the conversation. In some instances, the bot transfer engine 829 may utilize multiple thresholds to determine whether to present the conversation at the terminal device to allow an agent operating the terminal device to intervene in the conversation or to automatically transfer the conversation to the terminal device. For instance, if the sentiment score for a conversation is below a first sentiment score threshold but not a lower, second sentiment score threshold, the bot transfer engine 829 may present the conversation at the terminal device to allow the agent to intervene in the conversation if so required. However, if the sentiment score is below both the first and second sentiment score thresholds, the bot transfer engine 829 may automatically transfer the conversation to the terminal device for agent intervention. The sentiment score for a certain bot that has been selected using a mapped score instead of the bot's confidence score can be used as feedback for the mapping. A high sentiment score may increase the value of the mapping adjustment, and low sentiment score may lower the value of the mapping adjustment.

Feedback module 831 may be configured to, in conjunction with the processor 810, receive feedback on the conversation. Such feedback can be fed into calibration engine 837 to change mapping adjustments for bots using local data without changing the bot. The feedback may be provided by an agent operating the terminal device, by an automated sentiment system, by a customer, or by any other such source. The feedback may be reflective of how well the bot identified the intent and/or handled the request expressed by the user on the network device. Additionally, the feedback module 831 may obtain feedback from the user engaged in the conversation. For instance, at the end of a conversation, the feedback module 831 may transmit, to the network device utilized by a user, a request to provide feedback with regard to its conversation with the bot and/or live agent. This request may be provided in the form of a survey, through which the user may indicate its sentiment with regard to the conversation, as well as provide a performance evaluation of the bot and/or live agent. In some instances, the feedback module 831 may obtain feedback from the user engaged in the conversation during the conversation. For instance, the feedback module 831 may evaluate user responses during the conversation to determine the sentiment of the user. For example, the feedback module 831 may analyze the textual or non-textual attributes associated with user messages to identify whether the user messages include an anchor associated with a polarity. As an illustrative example, if the user indicates, in a message, that it is "frustrated" or indicates that the proposed solution is incorrect (e.g., a "no" response, etc.), the feedback module 831 may determine that the message represents a negative polarity and, thus, determine that the bot failed to identify the intent and/or handle the request expressed by the user in a satisfactory manner. The feedback may be received in any suitable form. For example, the feedback may be expressed on a letter scale, on a number scale, through words, through selection of icons or graphics, and/or the like. The interface displayed to the agent and/or user to provide the feedback and to render the views of the conversation may be handled by the user interface configuration engine 833 in conjunction with the processor 810.

The machine learning engine 835 may be configured to, in conjunction with the processor 810, feed the conversation, identified intent, and provided feedback into a database and analyze the data to draw inferences about how well a type of bot and/or live agent handled the conversation. This data, along with other historical conversation data and feedback, may be used to build a model that may be used to determine a future intent associated with one or more future requests. For example, if a particular type of bot successfully handled an "order_status" intent to the satisfaction of a user, future "order_status" intents may also be transferred to a bot of the particular type. In addition, future requests stating "I want my order status" may be automatically correlated with the "order_status" intent based on positive feedback. However, if a particular type of bot unsuccessfully handled an intent to the dissatisfaction of the user, future intents similar to the aforementioned intent may be transferred to a terminal device in order for these future intents to be handled by a live agent or to another type of bot that may be better suited to handle the intent based on a confidence score for the other type of bot and calculated based on the intent.

As an example, the first time a user contacts an agent with an intent of "delivery_status", the system may query relevant bots, adjust confidence values received from the bots based on a current real-time status of the calibration (e.g., mapping) system, and select an order status bot from the available bots based on the mapped score for the order status bot. The user may then be automatically redirected to the order status bot in real-time during the two-way communication (e.g., as part of the two-way communication). After the two-way communication is complete, the agent that managed transfer to the bot may provide feedback on one or more aspects of the interaction, such as whether the order status bot was the appropriate bot to which to transfer the conversation, and whether or not the order status bot was capable of resolving the intent, and the agents rating of how well the two-way communication proceeded when the order status bot was active. Further, the user may also provide feedback on similar or different aspects of the interaction, such as whether the order status bot successfully resolved the user's intent, whether the order status bot was responsive to the user's messages, whether responses from the order status bot were relevant to the intent and/or to the particular messages submitted by the user, and the like. Other techniques may be used to collect feedback regarding the interaction without explicit feedback from the agent and/or the user, such as by observing whether or not the agent had to intervene in the conversation, which may indicate that the order status bot was not the correct bot, that the conversation should not have been automatically transferred, or that the order status bot was not capable of resolving the intent. The feedback may be used to train a model that may be applied to future interactions. Such information may then be used to adjust the mapping values for the order status bot. Updated adjustment will then be used dynamically for future selection of bots associated with the same or similar input data (e.g., input matching or associated with "delivery status" or a delivery status intent identified by NLU). the model applied to future interactions.

Figure 9:
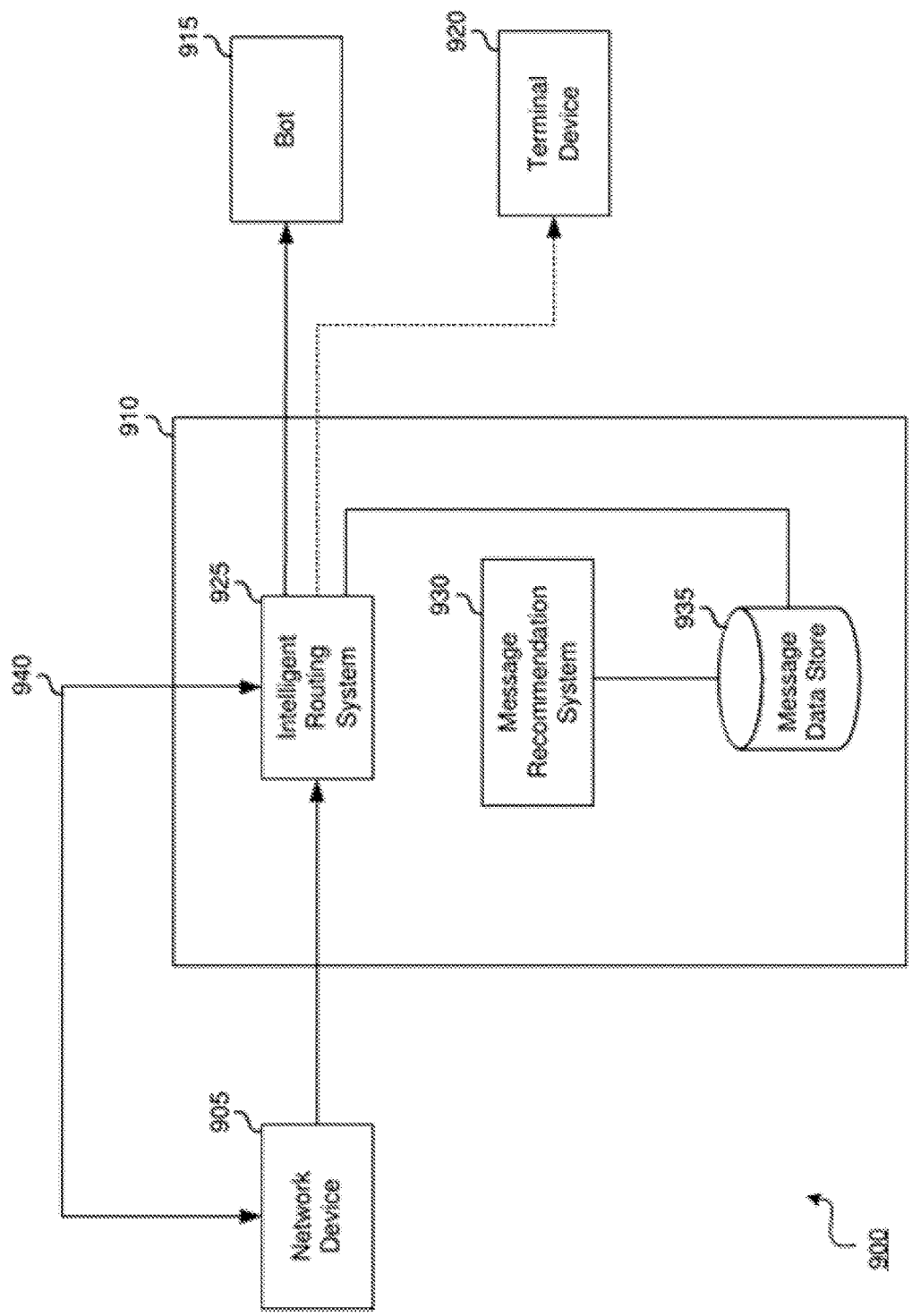
FIG. 9 shows a block diagram representing a network environment for feedback using machine-learning techniques in accordance with examples described herein.

FIG. 9 shows a block diagram representing network environment 900 for enhancing endpoint selection (i.e., a terminal device or a bot) using machine-learning techniques. Network environment 900 may include network device 905 (operated by a user) communication server 910, bot 915 and terminal device 920. Communication server 910 can facilitate the establishment of a communication channel that enables network device 905 and at least one bot 915 and terminal device 920 to communicate.

Communication server 910 may include intelligent routing system 925, message recommendation system 930, and message data store 935. In such a system, intelligent routing system 925 can include a calibration or mapping engine to query bots for confidence scores, and manage selection and transfer of communications between selected bots and agent terminals during a two-way communication. Each of intelligent routing system 925 and message recommendation system 930 may include one or more computing devices with a processor and a memory that execute instructions to implement certain operations. In some implementations, intelligent routing system 925 may be a bot configured to implement bot calibration and intelligently route communications received from network devices to the appropriate destination. Intelligent routing system 925 may include one or more processors configured to execute code that causes one or more machine-learning techniques or artificial intelligence techniques to provide dynamic feedback to calibration and bot selection operations in conjunction with real-time intelligent routing of messages. In some implementations, intelligent routing system 925 can execute one or more machine-learning techniques to train a model that predicts whether a message received from network device 905 may be successfully addressed by a bot 915.

As a non-limiting example, intelligent routing system 925 may receive a message from network device 905 through a communication channel established or facilitated by communication server 910 (e.g., a native application configured to enable users to communicate with each other across various devices). Intelligent routing system 925 may evaluate the incoming message according to certain embodiments described above. For example, intelligent routing system 925 may evaluate the content (e.g., text, audio clips, images, emoticons, or other suitable content) included in the received message using a trained machine-learning model to identify an intent. The input data (e.g., communication text and/or intent data) can be sent to available bots to receive confidence scores, and intelligent routing system 925 can then calibrate the received confidence scores. The confidence scores can be used to direct the communication to a selected bot 915, or if not bot is selected (e.g., no mapped score exceeds a threshold, bots of significantly different types have confidence scores above a threshold, etc.), the communication is routed to an agent using terminal device 920. Data from the intelligent routing can be stored in message data store 935 and integrated with various feedback systems using message recommendation system 930.

In some implementations, intelligent routing system 925 may request an acknowledgement from network device 905 of the predicted destination. As a non-limiting example, intelligent routing system 925 may evaluate the message using a machine-learning technique, and a result of the evaluation may include a prediction that bot 915 is the destination for the message. To confirm, intelligent routing system 925 may automatically request feedback signal 940. For example, feedback signal 940 may include a request for network device 905 to acknowledge whether bot 915 is the correct destination for the message (e.g., "Is Technical Support the correct destination?"). If network device 905 transmits the acknowledgement that bot 915 is the correct destination (e.g., the destination intended by the user operating network device 905), then intelligent routing system 925 may train the machine-learning model to predict that future messages including the exact or similar content (e.g., a threshold of similarity, such as 10 percent difference in content) as the received message are to be routed to bot 915. However, if intelligent routing system 925 receives feedback signal 940 indicating that bot 915 is not the correct or intended destination for the received message, but rather terminal device 920 is the correct or intended destination, intelligent routing system 925 can train the machine-learning model that future messages including the exact or similar content as the received message are to be routed to terminal device 920 (instead of bot 915). In some implementations, intelligent routing system 925 may not immediately update or train the machine-learning model to route future messages to terminal device 920, but rather, intelligent routing system 925 may wait for a threshold number of incorrect routings to bot 915 before routing all future messages with the exact same or similar content as the received message to terminal device 920.

Message data store 935 may store some or all messages received in the past from one or more network devices. Further, message data store 935 may also store some or all messages transmitted by terminal devices or bots during previous communication sessions with network devices. Message data store 935 may also store some or all messages transmitted by network devices to bots during communication sessions. Further, message data store 935 may store some or all messages transmitted by bots to network devices during communication sessions. In some implementations, message data store 935 may be a database of all messages processed (e.g., transmitted by or received at) communication server 910.

Message recommendation system 930 may analyze the database of messages stored at message data store 935. In some implementations, message recommendation system 930 may evaluate the messages stored at message data store 935 using one or more machine-learning algorithms or artificial intelligence algorithms. For example, message recommendation system 930 may execute one or more clustering algorithms, such as K-means clustering, means-shift clustering, Density-Based Spatial Clustering of Applications with Noise (DBSCAN) clustering, Expectation-Maximization (EM) Clustering using Gaussian Mixture Models (GMM), and other suitable machine-learning algorithms, on the database of messages stored in message data store 935. In some implementations, a recurrent neural network (RNN) or a convolutional neural network (CNN) may be used to predict response messages to assist the agent. In some implementations, message recommendation system 930 may use support vector machines (SVM), supervised, semi-supervised, ensemble techniques, or unsupervised machine-learning techniques to evaluate all previous messages to predict responses to incoming messages received from network devices during communication sessions. For example, message recommendation system 930 may evaluate the content of messages received from network devices (or messages received at communication server 910 from bots or terminal devices) and compare the results of the evaluation to the one or more clusters of previous messages stored in message data store 935. Once the cluster is identified, message recommendation system 930 can identify the most relevant response messages based on a confidence threshold. For example, an incoming message (e.g., received at communication server 910 from network device 905) may correspond to a technical issue based on the content of the incoming message. Message recommendation system 930 can identify that the incoming message corresponds to a technical issue based on an evaluation of the content of the incoming message (e.g., text evaluation). Message recommendation system 930 can access message data store 935 to identify the cluster of messages associated with technical issues. Message recommendation system 930 can select one or more response messages within the cluster of messages based on a confidence threshold. As a non-limiting example, a confidence algorithm can be executed to generate a confidence score. A confidence score may be a percentage value where the lower the percentage, the less likely the response is a good prediction for the incoming message, and the higher the percentage, the more likely the response is a good prediction for the incoming message. A minimum confidence threshold may be defined as a measure of certainty or trustworthiness associated with each discovered pattern. Further, an example of a confidence algorithm may be the Apriori Algorithm, similarity algorithms indicating similarity between two data sets, and other suitable confidence algorithms.

Figure 10:
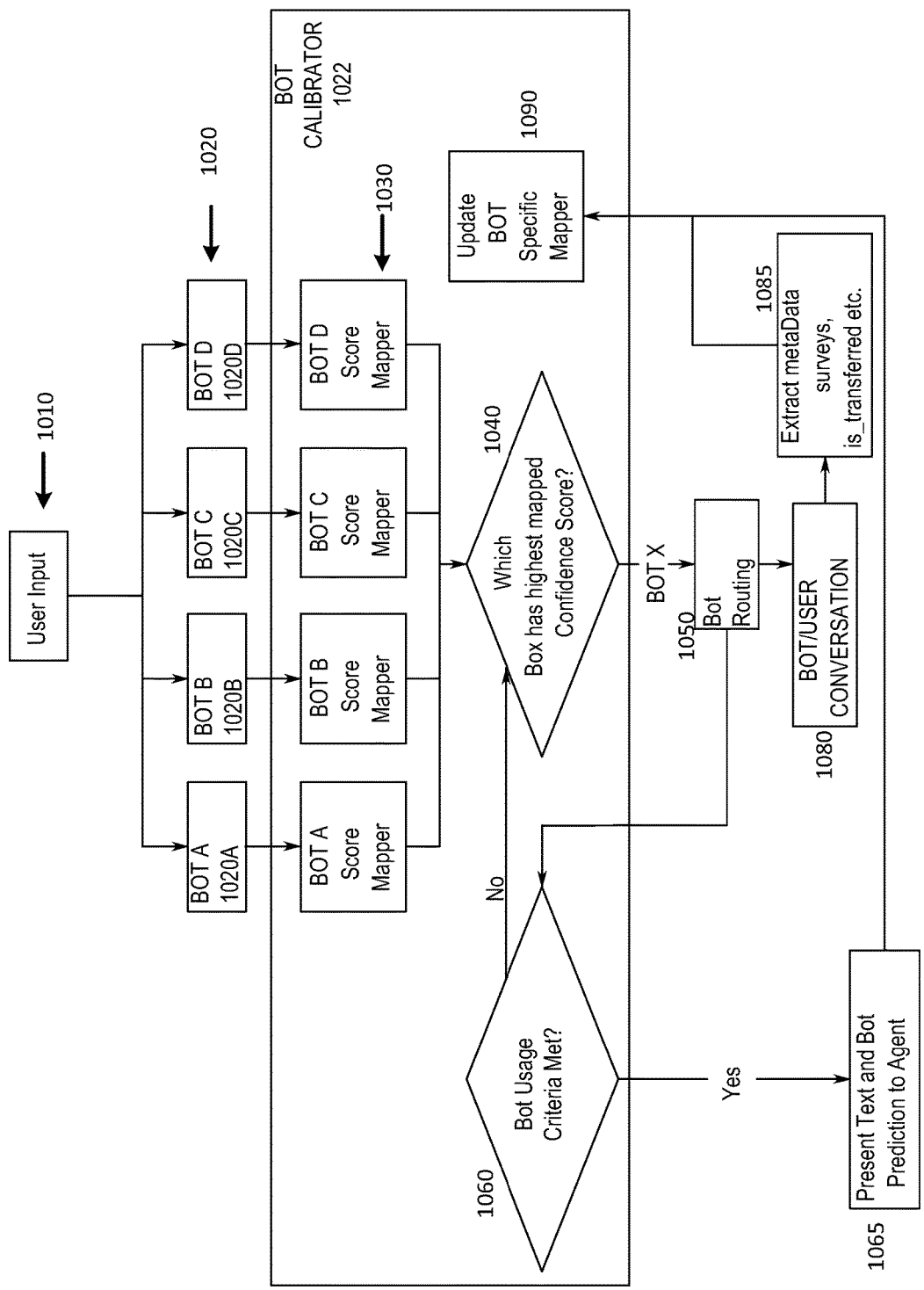
FIG. 10 illustrates aspects of a two-way communication session and associated input data in accordance with examples described herein.

FIG. 10 illustrates aspects of a two-way communication session and associated input data in accordance with examples described herein. FIG. 10 illustrates aspects of bot calibration as described above. In the chart of FIG. 10, input data 1010 (e.g., a user input as part of a two-way communication) is received. In some examples, the user input is text data, but in other examples, the user input can be any such data, including voice data, voice data that is converted to text data, and structured output data from a natural language processing system. A plurality of bots 1020, shown as bot A 1020A, bot B 1020B, bot C 1020C, and bot D 1020D are then queried for confidence scores. The confidence scores provided by the bots are independent (e.g., heterogeneous) representations of each bot's response to the input data. When the confidence scores are received, they are used in a bot calibrator 1022 (e.g., using bot score mappers) to generate mapped scores and select a bot based on the mapped scores. As illustrated, each bot 1020 has an associated bot score mapper 1030 as part of the bot calibrator 1022. In other implementations, a shared bot score mapper 1030 can be used to determine the relative confidence sore for the different bots. In some aspects, the bot calibrator used can be based on the set of bots being calibrated. For example, in an implementation using only bot A 1020A and bot B 1020C, a different calibrator or calibration can be used than for another system that uses all of bots A-D 1020A-1020D. Such different calibrators can be independently trained based on feedback from prior uses of the bots and results from communications that used the bots, to generate relative calibration scores compared to a particular set of bots. In other implementations, a general calibration system is used for all bots available to the system, regardless of the particular bots being used in a given instance of the system operation. In operation 1040, the bot calibrator identifies the highest mapped score of the mapped scores from the bot mapper(s) 1030, and selects the bot of the plurality of bots 1020 associated with the highest mapped score. In operation 1050, the selected bot with the highest mapped score is assessed for routing to the user. In some aspects, this can simply involve connecting the bot to the user (e.g., where the bot is routed to the user, and then used to facilitate the two-way communication in operation 1080). In other examples, additional logic can be used to determine whether to have to bot interact directly with the user, or to have usage criteria and/or agent assessment of the bot in operations 1060 and 1065. The facilitation can involve redirecting the two-way communication to the selected bot (e.g., routing the two-way communication from an agent or a handling bot to the selected bot, so the two-way communication becomes a communication between a customer and a device executing the selected bot). Information about the selected bot can be gathered in real-time during the two-way communication to be used for machine learning or other feedback mechanisms in operation 1090 to update the bot mapping for the selected bot. The feedback information can include metadata, surveys, or analysis of the data in the two-way communication analyzed in operation 1085. The feedback information can also include an analysis of the bot performance and selection by an agent in operation 1065. In the example of FIG. 10, after routing the two-way communication to use the selected bot, the mapped score is checked against bot usage criteria to determine if the selected bot is to be used. The bot usage criteria can be a bot specific threshold in operation 1060. If the threshold triggers an agent analysis, then the agent analyzes data (e.g., the input data, a description of the bot operation or functionality, or other data about the bot) in operation 1065 to provide additional feedback. In some such examples, if the agent objects to the selection, or provides negative feedback, another bot can be selected, and the bot specific information in the bot calibrator can be updated (e.g., the bot score mapper 1030 of that generates the mapped score for the selected bot) to negatively adjust an associated between the input data or similar data (e.g., input data with similar intent values) and the selected bot. In operation 1060, the bot usage criteria can be any criteria based on the confidence score or the mapped confidence score (e.g., alone or in combination with other data) to determine if the selected bot meets a basic error check or reasonable relevance check. If the selected bot fails the usage check, the bot calibrator can remove the selected bot from consideration and return to operation 1040 to select another bot. In some examples, if a threshold number of bots (e.g., two bots, three bots, five bots, etc.) have failed to meet the usage criteria, the system can assume that no bot or related information is available through the automated system, and maintain the two-way communication with a current human agent or route the communication to a human agent based on NLU analysis of the input data.

In some examples, rather than routing the user to the selected bot in operation 1050, an intervening analysis can be performed. The intervening analysis can be a manual agent analysis, or an automated check against thresholds. In some examples, if the selected bot has a mapped confidence score below a threshold value, an agent can be used to confirm the selection of the bot before the user is routed to the bot. In some examples, multiple bots are selected, and sent to an agent for the agent to select or reject the top bots from the mapped scores provided by score mapper(s) 1030. In some examples, an analysis is performed on the top mapped scores to identify irregularities in the identified bots. For example, if multiple unrelated bots have a mapped score above a certain threshold, an agent may be used to confirm that the selected bot is appropriate for the two-way communication.

In some examples, a server device or server system can perform many different instances of the analysis described in FIG. 10 at the same time, with different instances performing different steps at the same time, depending on the current status of a communication associated with a given instance or type of communication. For example, certain communications associated with certain intent values, as described above, can have different sets of associated bot scores, as certain bots can provide different performance for different customer intents. A communication server can actively manage multiple different bot calibration sessions for different criteria (e.g., intent values, customer issue values, etc.). In some such systems, bot score mapping for different criteria can be performed dynamically and in real-time for different criteria simultaneously, with bot score updates and criteria used separately for the different criteria. Updates to the different bot calibrators for different criteria can then be performed by the same device or system at the same time, as data for a given criteria is gathered from associated communication sessions.

In one example, bot A 1020A can be a bot that assists with appointment scheduling for sales, bot B 1020B can be a bot that assists with appointment scheduling for service calls, bot C 1020C can be a bot that assists with finding information from a database for a product "widget", and bot D 1020D can be a bot that assists with connecting users to tech support. A user input can be a voice input from a customer to a call center that has been converted to text by a voice to text system, and is input as "I need help scheduling assistance for a problem with my widget". This information can be submitted to each of the bots 1020, and each bot can output an uncalibrated relevance score. For example, bot A 1020A may return a score of 200, bot B 1020B may return a score of 9, bot C may return a score of 50, and bot D may return a score of 15. The bot mappers 1030 for bots A-D can then accept the scores as part of bot calibrator 1022, and output normalized scores. The score from bot A 1020A may be based on a scale of 1000, and be mapped by the score mapper to a standardized scale of 1000, with an adjustment based on history data with similar input data down from a standardized score of 200 to an adjusted standardized score of 90. The standardized score in the score mapper can be a score that simply standardizes the base scale of the score (e.g., changing from a maximum score of 20 to a maximum score of 1000, or any other such maximum score). The adjustment can be a machine learning driven adjustment based on history data that uses feedback to shift the score. For example, which a bot is selected, and feedback data indicates that the bot was not suited for the user input, the score mapper can receive an input to create a negative adjustment value for that bot when similar user input data is received in the future.

Returning to the example, the score from bot B may be based on a scale of 10, and the score mapper 1030 can generate a standardized score of 900, with an adjusted score of 950, based on previous positive results (e.g., mapping the sub-term "scheduling assistance" from the input data to positive results in history data used to create a positive adjustment in the score mapper 1030 for bot B). The score from bot C may be based on a scale of 100, and the bot mapper can generate a standardized score of 500 with an adjusted score of 500 (e.g., no adjustment based on history data). The score from bot D may be based on a scale of 20, and generate a standardized score of 750 with an adjusted score of 850, based on history data associated with ("a problem with my widget").

The bot calibrator 1022 can then identify the bot having the highest adjusted standardized score, which in this situation would bot B, with an adjusted score of 950 out of 1000. In operation 1050, the bot routing can analyze the characteristics of the selected bot for additional criteria. In some implementations, the bot can be routed directly to the user to proceed with a bot/user conversation in operation 1080. In other implementations, additional criteria can be implemented. For example, if a client (e.g., a merchant associated with the bots and the "widget" product) implements a criteria that automated bots (e.g., bot C) are to be used prior to any bots associated with a human agent (e.g., bots A, B, and D, which involve scheduling or connection with a human agent), then in operation 1060, bot B will be rejected as associated with a human agent, and bot C will be selected based on the criteria that an automated bot be used. In some aspects, as part of the criteria analysis of operation 1060, a human agent can analyzed the user input 1010 and additional information (e.g., a history of the customer associated with user input 1010 repeatedly requesting information on repairing a widget), and override the usage criteria to allow the scheduling bot B to be used. In other aspects, the bot C may be used based on the usage criteria. In some implementations, the bot C operation may have an end point where bot C identifies that bot C is unable to resolve the customer issue, and an additional bot selection can be used. The additional bot selection can use the prior calibrated scores, stored in memory, along with the criteria associated with an automated bot. History data indicating that an automated bot has been used and has failed can then be used as part of bot usage criteria operation 1060 to allow the prior bot B with the highest score, but that is associated with a human agent, to be selected based on the failure of the automated bot (e.g., the bot not associated with human agent interactions).

After resolution (e.g., completion or delay) of the communication associated with the bot selection, any data, including the user input data 1010, data from the bot/user conversation operation 1080, calibrated scores from bot calibrator 1022 and score mapper(s) 1030, any human agent input from operation 1065 or usage criteria decisions in the system from operation 1060, can be used along with feedback data received from operation 1085. All such data can then be used to update bot mappers in operation 1090. In some aspects, the update to bot mappers in operation 1090 can use machine learning to update training for a given bot mapper or mapper(s). In some implementations, history data is gathered for a given period of time, and bot mapper(s) 1030 are retrained using updated data at periodic intervals. In some implementations, the data is gathered in real-time, so that as a system using bot calibrator 1022 interacts with hundreds or thousands of customers simultaneously, the data from each communication with a customer is fed into the bot mapper training systems in real-time, and the bot mappers can be dynamically updated using real-time feedback data at the same time that the bot mappers are being used to calibrate scores for new user inputs that are received by the system. The new user inputs are then assessed to select bots for the new user inputs, and feedback from those communications is similarly feed back into bot score mapper training (e.g., as modifications to adjustments of standardized scores associated with particular user inputs) to improve system operation by improving selection of bots used to resolve customer issues.

Figure 11:
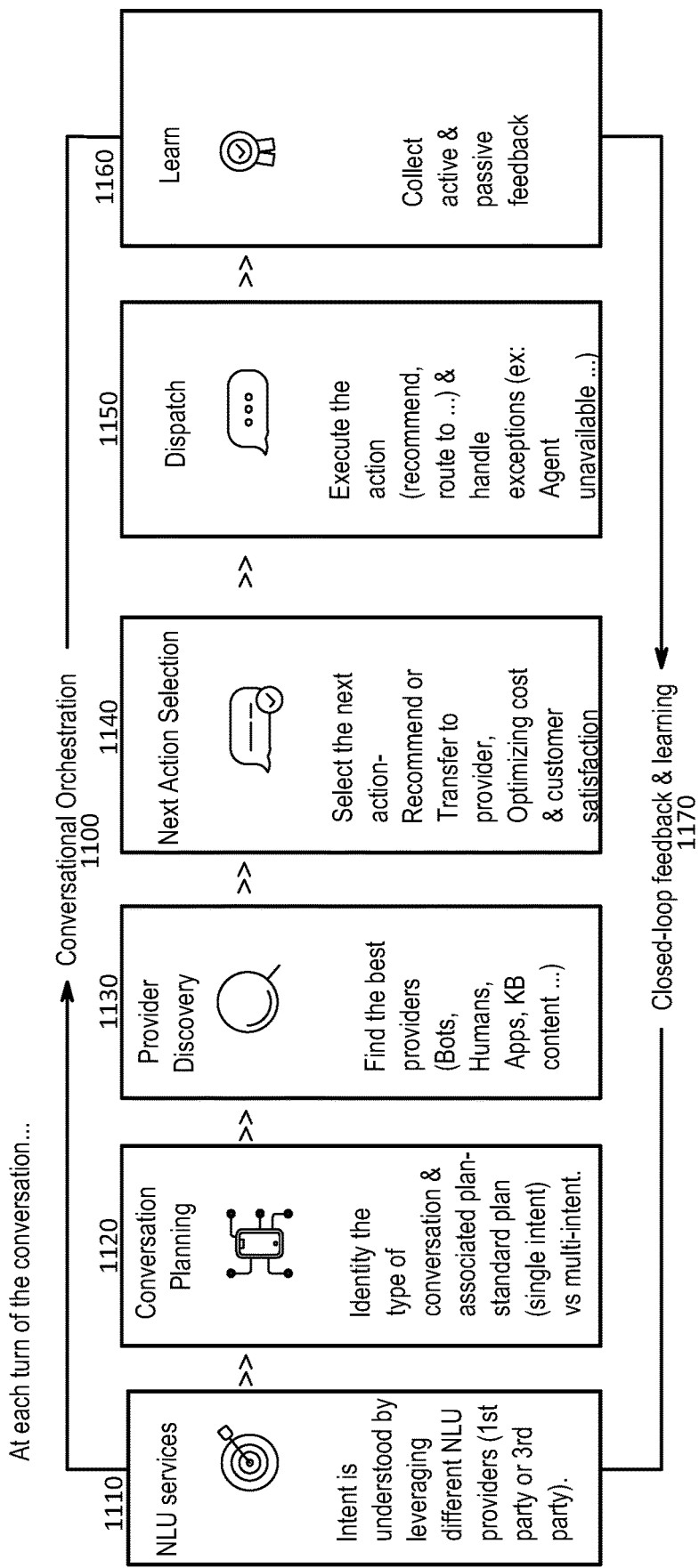
FIG. 11 illustrates aspects of a two-way communication facilitated using bots selected in accordance with examples described herein.

FIG. 11 illustrates aspects of a two-way communication facilitated using bots selected in accordance with examples described herein. FIG. 11 illustrates an analysis of each turn (e.g., a communication or action as part of a two-way communication between a user/client and an agent or bot) in a two-way communication, using bot calibration as described herein.

As shown by FIG. 11, input data for each turn results in a set of conversation orchestration operations 1100. Input data for a turn is initially processed by NLU services 1110. Such NLU services can identify intent values, keywords, or other such input data. Intent values can be generated by leveraging one or more NLU services, including local NLU or remote NLU services. Such NLU analysis is performed in real-time or near real-time, such that an NLU analysis for one turn can be in processes when another turn occurs, and the additional turn can be integrated with an in process NLU analysis for the two-way communication, or an additional NLU analysis can occur for the new turn in real-time. NLU data (e.g., intent values) is then used in conversation planning 1120. Conversation planning can use the NLU data from NLU services to identify a conversation "type" or a response plan. Additionally, conversation planning 1120 can identify a multi-intent two-way communication (e.g., where a user wants to both schedule a new appointment and receive a list of previously made appointments, or take any such plurality of different actions which may use different system services such as multiple different bots). Conversation planning 1120 may identify a script from an initial intent identified by NLU services 1110 or an initial bot to manage gathering of additional information or support to facilitate the two-way communication.

Provider discovery 1130 is then dynamically performed to identify the best resources for the two-way communication based on the conversation planning 1120 and NLU data from NLU services 1110. Provider discovery 1130 can include the operations described above in FIG. 10 to query bots, receive bot confidence scores, and map the confidence scores. Provider discovery can additionally compare the identified bots with additional options, such as human agents associated with the NLU data (e.g., agents with specialized information associated with an intent), non-bot applications that may facilitate the two-way communication, informational content for an agent or customer, or other such data. For example, a mapping or calibration system as described above may not only receive calibration data from bots, but may additionally access value or confidence scores for other resources, such as static help text associated with NLU data, or agent profiles associated with NLU data. Various criteria may be used to determine when to provide non-bot resources to a customer rather than identified bots. For example, as described above, if no bot has a mapped score above a threshold level, an agent resource may be identified or a current agent may be provided a list of resources including informational text, bots, scripts, or any combination of such resources for a current agent to select.

In Next action selection 1140, the resources identified in provider discovery 1130 are used to select a next action. For example, in the implementation above with bot threshold selection criteria, if a bot does have a mapped score above a threshold, next action selection 1140 may automatically select the bot with the highest mapped score. In another example, a current agent is presented with one or more options identified by provider discovery 1130, and an agent selects the next action from the available options in selection 1140. Once the selection 1140 occurs, the resource selected is executed in dispatch operations 1150. The dispatch 1150 can include routing a customer to a connection with a selected bot, providing identified information to a customer, or any other such actions associated with the resource selected in next action selection 1140. All such operations from NLU services 1110 through dispatch 1150 occur dynamically in real-time, which includes multiple such threads occurring simultaneously if a user takes multiple turns as described below with respect to FIG. 12. Conversation planning 1120 can, for example, manage presentation of multiple different resources in a multi-intent communication, as well as managing feedback on resources used in a communication (e.g., re-planning when a user provides negative feedback on a dispatched bot). The real-time nature of the conversation orchestration 1100 allows a customer to receive responses quickly as part of a two-way communication, and the dynamic nature allows the conversation orchestration 1100 to adapt or respond to multiple turns from a customer in the two-way communication. Bots identified through provider discovery provide efficient responses to standard customer requests, and dynamic analysis with NLU services 1110 and planning 1120 allows conversation orchestration 1100 to use a variety of resources as well as leverage human agents for complex interactions to improve the efficiency a system and the quality of information and services provided to a customer through a two-way communication system.

Learning operations 1160 can additionally collect active and passive feedback from each turn of conversation orchestration 1100, as well as aggregated data (e.g., text, metadata, agent analysis, customer polling data, etc.) for system operation. As described above, such information can be used by the system to improve each step of conversation orchestration 1100. Examples described herein particularly use feedback from learning operations 1160 to update mapping data used to generate mapped scores from bot calibration data as described above in FIG. 10. The feedback can be used to adjust scores in a mapping table or mapping file that associate NLU data and/or input data with particular bots, and to adjust the bot calibration scores to dynamically generate mapped scores. A system can update the mapping table or other such mapping systems in real-time without downtime for updates by adjusting the mapping table data in real-time in response to feedback. The real-time feedback allows data from a first two-way communication to inform the selection of a bot in a second two-way communication that is occurring at the same time as the first two-way communication. As soon as feedback from the first two-way communication is received, the mapping scores can be updated to reflect the feedback, and to provide the mapping for the second two-way communication if an associated input is received that analyzes the same bot in a discovery 1130 operation for a turn of the second two-way communication.

The mapping file can store not only adjustment data associated with NLU data, input data, and a particular bot, but can also store feedback history data that can be used to determine how future adjustments in response to feedback are made. For example, when an initial association is made between input data and a bot, no mapping data may exist, and so the confidence score from the bot may be used with no adjustment. Initial feedback in response to the first system identification or selection of a bot in response to input data can be used to make a large adjustment calibration for future selections of the bot in response to the same or similar input data. As the system sees additional selections of the same bot in response to similar input data, the magnitude of the adjustment allowed in response to feedback can be limited as the feedback system tracks a local confidence that is different than the confidence generated by the bot directly.

In some examples, a bot may integrate the feedback as well as the mapping system. In such examples, the mapping system can track changes in bot confidence scores, so that rather than providing an adjustment to the bot scores, the mapping system identifies a local score that is adjusted. For example, a "schedule" bot may return a confidence score of 0.95 in response to the input data "appointments". A mapping system may identify a mapped score of 0.8 for that combination of input data and bot. Rather than simply adjusting the confidence score by −0.15 for that combination, the mapper may target 0.8, so that if updates and feedback integrated by the schedule bot shift the schedule bot's confidence response to appointments down to 0.88, the mapping system maintains the mapped score of 0.8. In other examples, an adjustment may be tracked in the mapping system, and the mapping system may reset a feedback analysis when the bot's confidence score changes in response to the same input, to reflect the changes in the bot operation. By tracking confidence scores generated by the same input data over time, a mapping system can automatically respond to updates for a bot. For example, if a mapping system identifies an update to a calibration score for one particular input data, analysis thresholds can be adjusted or reset for all inputs associated with the bot until the extent of the changes to the bot are identified by the mapping system. Minor changes to a bot can allow history data to be used even after changes to the bot are identified, while major changes to a bot can result in history data for a bot being discarded and the mapping system treating the bot as a new bot with no history. The mapping system can then dynamically track the updated bot over time to seek local confidence scores with local data until another major update or change to the bot occurs.

Figure 12:
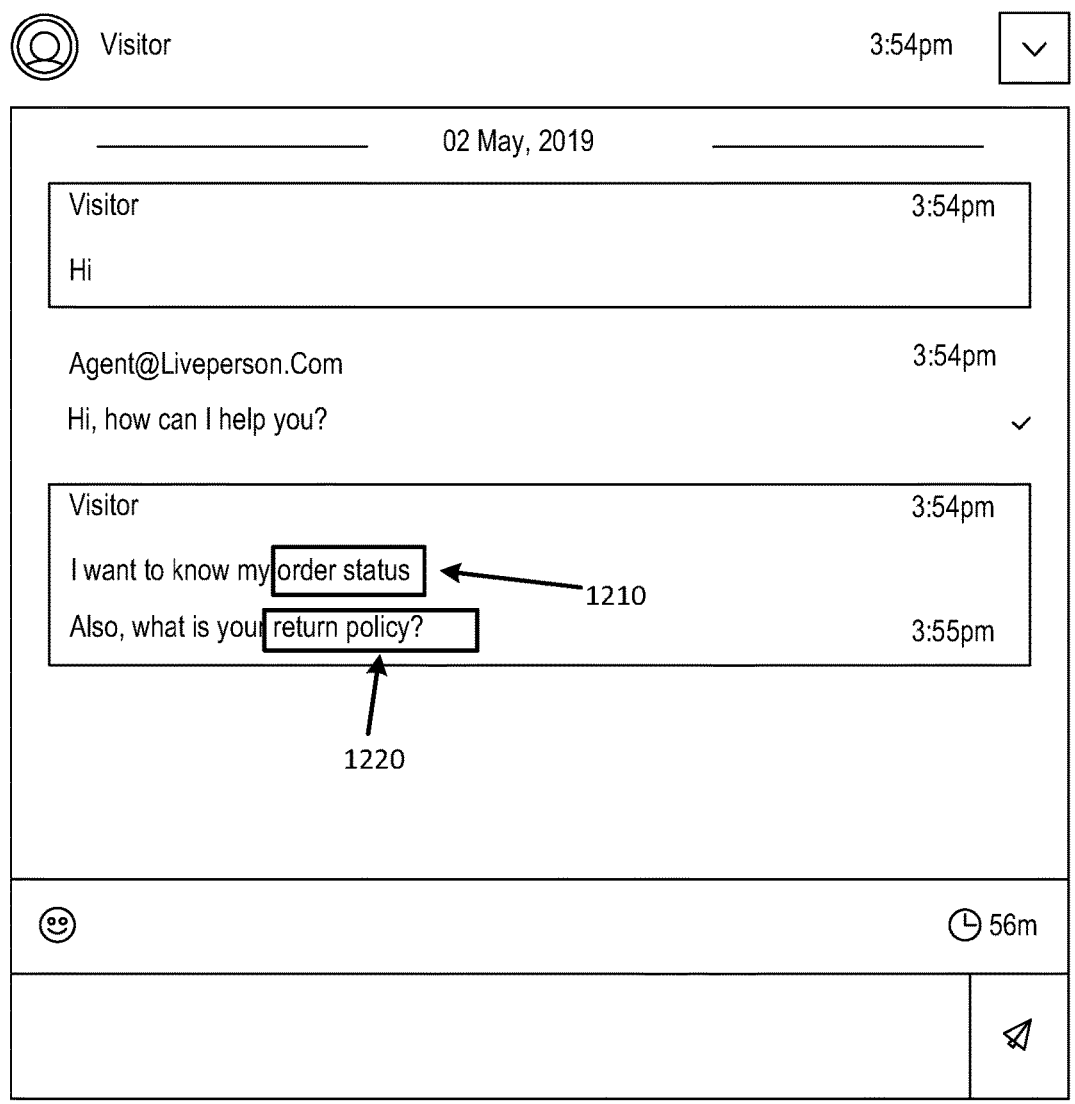
FIG. 12 illustrates a two-way communication facilitated with natural language understanding (NLU), bots, and feedback systems in accordance with examples described herein.

FIG. 12 illustrates a two-way communication facilitated with natural language understanding (NLU), bots, and feedback systems in accordance with examples described herein. FIG. 12 shows user interface 1200 for a two-way communication. The interface 1200 can include metadata, such as time stamps and identifying information for participants in the two-way communication. The interface 1200 can additionally include text input data for each turn of an interaction. As shown in FIG. 12, interface 1200 includes input data 1210 and input data 1220 for two turns taken sequentially by the customer labeled "visitor". As described above, each turn can be processed individually, according to a conversation orchestration 1100. In the example of FIG. 12, the input data 1210 "order status" can be processed independently from the input data 1220 "return policy". Each of these pieces of input data can be processed using the flow described above in FIG. 11, with NLU services 1110 identifying NLU data, conversation planning 1120 identifying a plan for the input data response, and provider discovery 1130 identifying possible resources associated with the input data.

Figure 13:
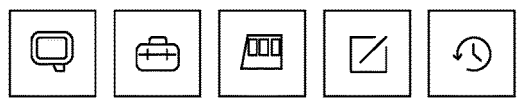
FIG. 13 is a flowchart illustrating aspects of bot selection calibration in accordance with some examples described herein.

FIG. 13 illustrates a user interface 1300 for an implementation where a provider discovery 1130 system presents an agent with a top resource for each piece of input data 1210 and 1220 above. Response element 1310 presents the "order status" input data 1210 along with an identified bot "orderBot". The orderBot can be identified by querying bots in the system, mapping the calibration scores received from the system bots, and selecting orderBot as the bot with the highest mapped score (e.g., 96% in the sample of FIG. 13). Similarly, input data 1210 can be processed with the same analysis. Rather than identifying a bot, however, an article with information relevant to the input data 1220 "return policy" is identified. In a provider discovery 1130 operation, no bot with a threshold or higher relevance or confidence score may be identified, and so the "return policy" article resource is identified as the best resource to facilitate the two-way communication in response to the identified input data "return policy". The response element 1320 presents the information on the article to an agent in the agent user interface 1300, with an input interface element that allows the resource to be used to facilitate the two-way communication. In the example of FIG. 13, an agent participating in the two-way communication can respond to the two inputs taken by sequential customer turns by selecting the "use article" element of response element 1320 to provide information on the return policy, and can then route the user to the orderBot by selecting the "join" element of response element 1310.

In other examples, rather than a human agent being presented user interface 1300 to manage the two-way communication, a bot or other machine curator for the conversation can automatically integrate the identified resources into the two-way communication. In either case, feedback data from the customer in the two-way communication can be used to dynamically select alternate resources, and to provide real-time feedback to changes the flow or conversation plan (e.g., for conversation planning 1120) for a two-way communication.

Figure 14:
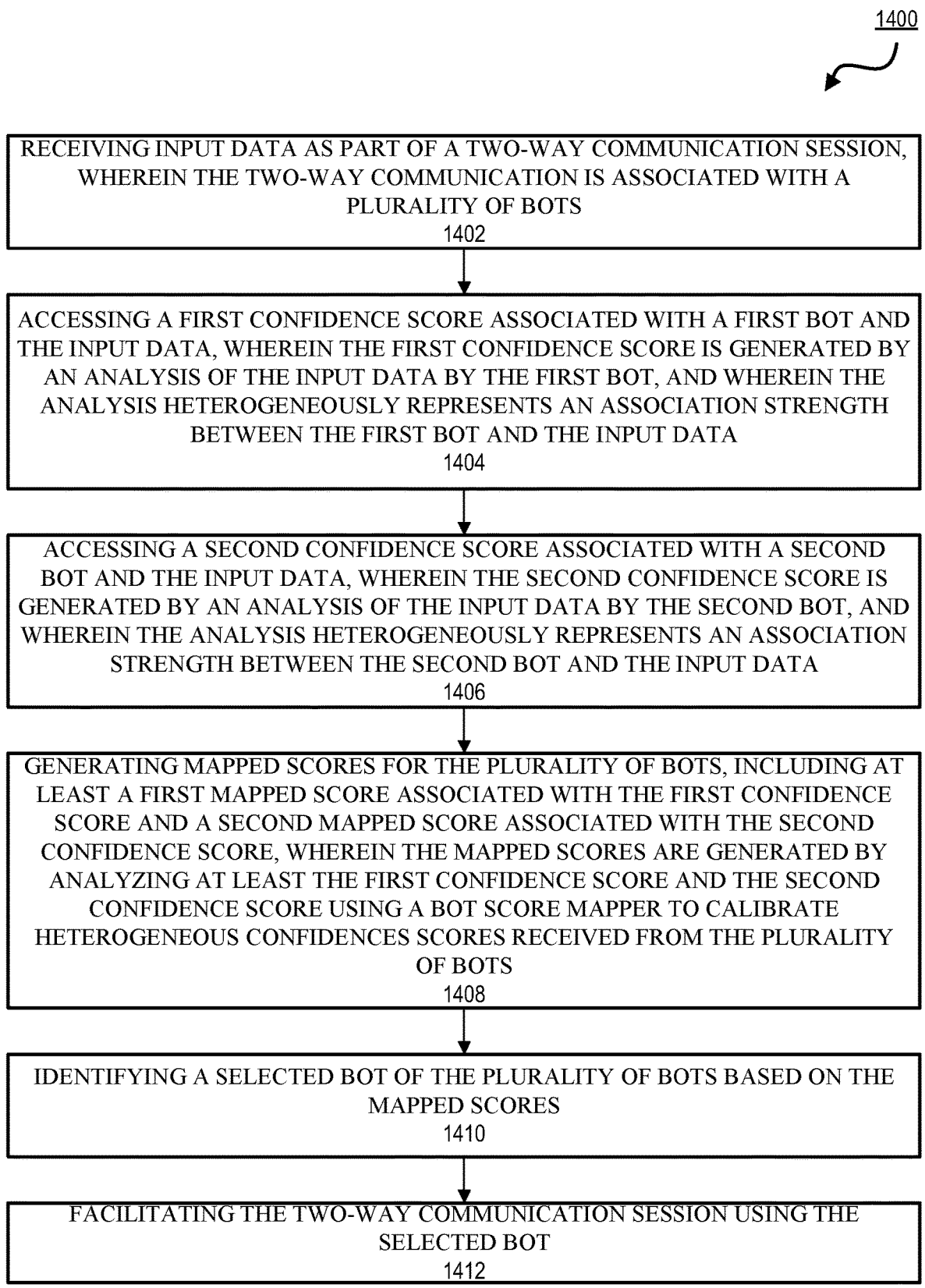
FIG. 14 is a flowchart of a method for bot selection calibration in accordance with examples described herein.
Figure 15:
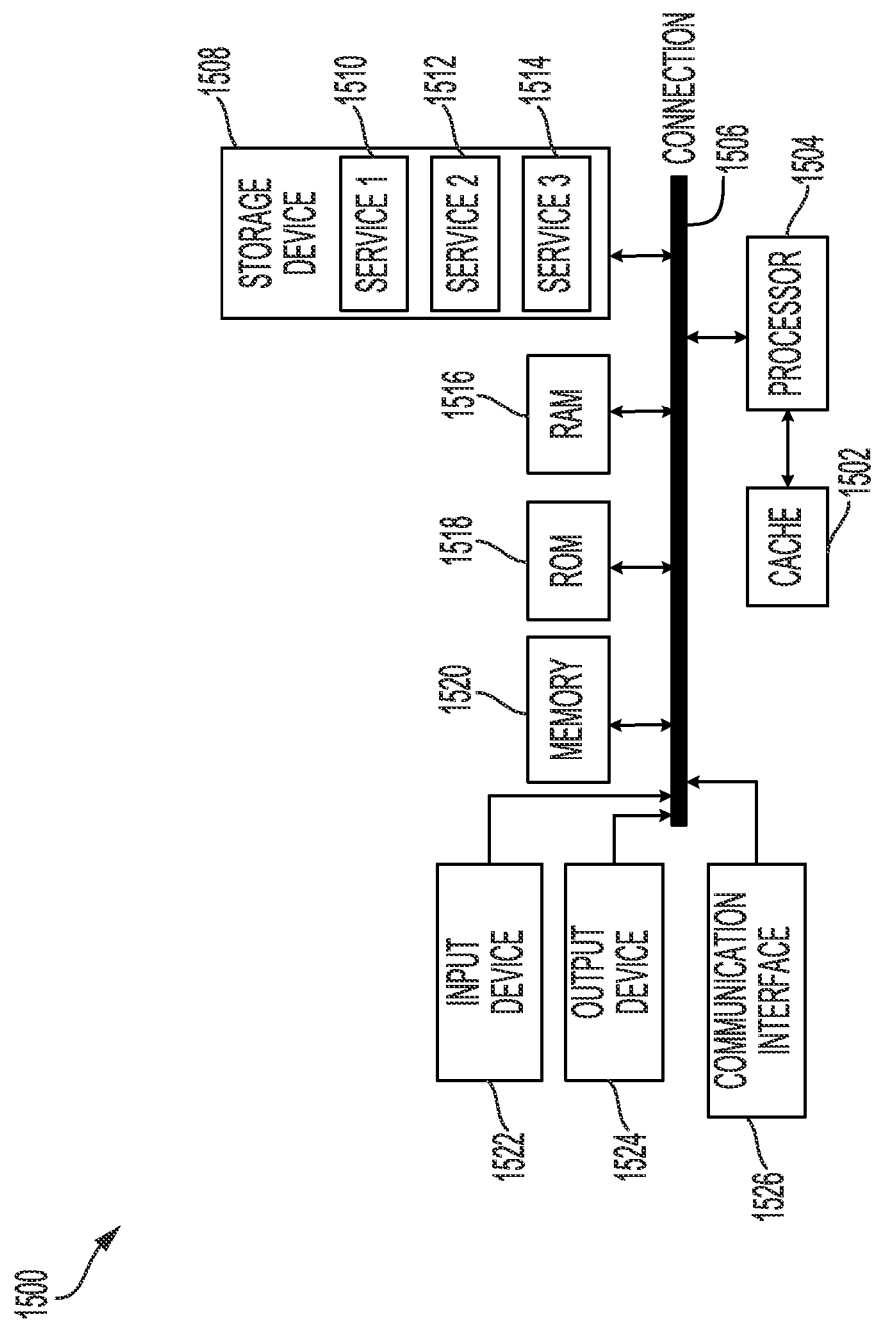
FIG. 15 is an example of a computing device that can be used to implement devices in a two-way communication system with bot selection calibration in accordance with examples described herein.

FIG. 14 is a flowchart of a method 1400 for bot selection calibration in accordance with examples described herein. Method 1400 can be implemented by any device participating in a two-way communication, such as a connection management system 150 or 450, an interaction management engine 625, a communication server 710 or 805, or any other such device including a memory and one or more processors configured to perform method 1400. In some examples, an agent terminal or user device can integrate the functionality for method 1400. In some examples, method 1400 is implemented as instructions stored in a non-transitory computer readable medium that, when executed by one or more processors of a device, cause the device to perform operations comprising method 1400.

Method 1400 includes operation 1402 for receiving input data as part of a two-way communication session, wherein the two-way communication is associated with a plurality of bots. Method 1400 includes operation 1404 including accessing a first confidence score associated with a first bot and the input data, wherein the first confidence score is generated by an analysis of the input data by the first bot, and wherein the analysis heterogeneously represents an association strength between the first bot and the input data. Method 1400 includes operation 1406 including accessing a second confidence score associated with a second bot and the input data, wherein the second confidence score is generated by an analysis of the input data by the second bot, and wherein the analysis heterogeneously represents an association strength between the second bot and the input data. Method 1400 includes operation 1408 including generating mapped scores for the plurality of bots, including at least a first mapped score associated with the first confidence score and a second mapped score associated with the second confidence score, wherein the mapped scores are generated by analyzing at least the first confidence score and the second confidence score using a bot score mapper to calibrate heterogeneous confidences scores received from the plurality of bots. Method 1400 includes operation 1410 including identifying a selected bot of the plurality of bots based on the mapped scores. Method 1400 includes operation 1412 including facilitating the two-way communication session using the selected bot.

In some examples, the selected bot does not have a highest confidence score out of self-generated confidence scores generated by the plurality of bots, and the selected bot has a highest mapped score of the mapped scores for the plurality of bots. In some examples, method 1400 can further include comparing the first mapped score against a bot specific threshold value when the first mapped score is a highest value score of the mapped scores and rejecting the first mapped score when the first mapped score is below a bot specific threshold.

In some examples, method 1400 can further include receiving feedback data for the selected bot and dynamically updating a mapping adjustment value associated with the user input data and the selected bot of the bot score mapper based on the feedback data.

In some examples, method 1400 can further include repeatedly receiving feedback associated with an input data type associated with the user input data and dynamically updating a mapping adjustment value associated with the user input data and the selected bot of the bot score mapper based on the feedback, wherein a maximum adjustment of the mapping adjustment value is selected based on a number of previous adjustments to the mapping adjustment value for the selected bot, where the selected bot is based on a real-time feedback state of the bot score mapper associated with receipt of the user input data.

In some examples, method 1400 can further include updating a mapping adjustment value associated with the user input data and the selected bot of the bot score mapper based on feedback data, wherein the feedback data is automatically generated from metadata of the two-way communication session and two-way conversation data.

In some examples, method 1400 can further include updating a mapping adjustment value associated with the user input data and the selected bot of the bot score mapper based on feedback data, wherein the feedback data is manual feedback provided by an agent participating in the two-way communication session.

In some examples, method 1400 can further include receiving an agent input rejecting the selected bot and selecting a second selected bot based on the mapped scores excluding a score of the selected bot. Some examples can operate where the plurality of bots includes one or more client bots, one or more source bots, and one or more external bots.

In some examples, method 1400 can further include transmitting one or more confidence score requests, wherein when the one or more confidence score requests are received by a server executing one or more bots, the server generates confidence scores for the one or more bots, the confidence scores including the first confidence score and the second confidence score.

In some examples, method 1400 can further include executing instructions for the first bot and the second bot using one or more processors of the device and generating the first confidence score and the second confidence score using the one or more processors of the device. Some examples can operate where the user input data is text data.

In some examples, any operations of method 1400 can be performed at the same time for many different communications, such that operations of one instance of method 1400 can be performed at the same time operations of another instance of method 1400. As described above, such examples allow the use of separate bot analysis and calibration for different bot criteria, such as different intent values or customer issue values. Separate bot calibration can include a single device or system performing bot calibration for one set of criteria at the same time as bot calibration for a separate set of criteria. Additionally, the bot calibration described herein and other such operations can occur simultaneously with any number of communication sessions, with data and feedback from the communication sessions used in real-time to update datasets used for training as the system is facilitating any number of communication sessions.

Specific details are given in the above description to provide a thorough understanding of the embodiments. However, it is understood that the embodiments can be practiced without these specific details. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments. Additionally, some examples can operate with repeated or intervening operations, and multiple instances of operations can occur with dynamic adjustments made in response to real-time feedback to update data for a bot score mapper to change adjustments to confidence scores and to change selections of resources (e.g., bots, articles, human agents, etc.) selected to facilitate a two-way communication.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
   receiving input data as part of a two-way communication session;
   simultaneously providing the input data to a plurality of bots;
   simultaneously receiving heterogeneous confidence scores for the plurality of bots, wherein a heterogeneous confidence score corresponds to a bot and is generated using an analysis by the bot of the input data, and indicates an association strength between the input data and the bot;
   generating mapped scores for the plurality of bots by calibrating the heterogeneous confidence scores with an associated bot score mapper, wherein mapped scores are standardized confidence scores;
   selecting a first bot based on a first mapped score for the first bot having a highest value score of the mapped scores;
   comparing the first mapped score for the first bot against a first bot specific threshold value;
   rejecting the first mapped score when the first mapped score is below the first bot specific threshold value;
   selecting a second bot based on a second mapped score for the second bot having a next highest value score of the mapped scores;
   comparing a second mapped score for a second bot against a second bot specific threshold value, wherein the second bot specific threshold value is different than the first bot specific threshold value;
   selecting the second bot based on the second bot meeting the second bot specific threshold value;
   facilitating the two-way communication session using the second bot; and
   recalibrating one or more of the standardized confidence scores of the bot score mappers, based on the selection of the second bot and the two-way communication session, thereby adjusting subsequent bot selection.

2. The computer-implemented method of claim 1, further comprising processing the input data to identify a bot type associated with the two-way communication session.

3. The computer-implemented method of claim 1, wherein the plurality of bots are associated with a respective bot type.

4. The computer-implemented method of claim 1, wherein the selected second bot does not have a highest confidence score of self-generated confidence scores generated by the plurality of bots; and
   wherein the selected second bot has a highest mapped score of the mapped scores for the plurality of bots.

5. The computer-implemented method of claim 1, further comprising:
   receiving feedback data; and
   updating a mapping adjustment value associated with the input data and the selected second bot of the bot score mapper based on feedback data, wherein the feedback data further includes manual feedback provided by an agent participating in the two-way communication session.

6. The computer-implemented method of claim 1, further comprising:
receiving an agent input rejecting the selected second bot; and
selecting an additional bot based on the mapped scores excluding a score of the selected bot.

7. The computer-implemented method of claim 1, wherein the plurality of bots includes one or more client bots, one or more source bots, and one or more external bots.

8. The computer-implemented method of claim 1, further comprising:
transmitting one or more confidence score requests, wherein when the one or more confidence score requests are received by a server executing one or more bots, the server generates confidence scores for the one or more bots.

9. The computer-implemented method of claim 1, further comprising:
executing instructions for the plurality of bots using one or more processors of a device; and
generating the mapped scores using the one or more processors of the device.

10. A system comprising:
a memory; and
one or more processors coupled to the memory, the one or more processors configured to perform operations comprising:
receiving input data as part of a two-way communication session;
simultaneously providing the input data to a plurality of bots;
simultaneously receiving heterogeneous confidence scores for the plurality of bots, wherein a heterogeneous confidence score corresponds to a bot and is generated using an analysis by the bot of the input data, and indicates an association strength between the input data and the bot;
generating mapped scores for the plurality of bots by calibrating the heterogeneous confidence scores with an associated bot score mapper, wherein mapped scores are standardized confidence scores;
selecting a first bot based on a first mapped score for the first bot having a highest value score of the mapped scores;
comparing the first mapped score for the first bot against a first bot specific threshold value;
rejecting the first mapped score when the first mapped score is below the first bot specific threshold value;
selecting a second bot based on a second mapped score for the second bot having a next highest value score of the mapped scores
comparing a second mapped score for a second bot against a second bot specific threshold value, wherein the second bot specific threshold value is different than the first bot specific threshold value;
selecting the second bot based on the second bot meeting the second bot specific threshold value;
facilitating the two-way communication session using the second bot; and
recalibrating one or more of the standardized confidence scores of the bot score mappers. based on the selection of the second bot and the two-way communication session, thereby adjusting subsequent bot selection.

11. The system of claim 10, wherein the one or more processors are configured for operations further comprising processing the input data to identify a bot type associated with the two-way communication session.

12. The system of claim 10, wherein the plurality of bots are associated with a respective bot type.

13. The system of claim 10, wherein the selected second bot does not have a highest confidence score of self-generated confidence scores generated by the plurality of bots; and
wherein the selected second bot has a highest mapped score of the mapped scores for the plurality of bots.

14. The system of claim 10, wherein the one or more processors are configured for operations further comprising:
receiving feedback data; and
updating a mapping adjustment value associated with the input data and the selected second bot of the bot score mapper based on feedback data, wherein the feedback data further includes manual feedback provided by an agent participating in the two-way communication session.

15. The system of claim 10, wherein the one or more processors are configured for operations further comprising:
receiving an agent input rejecting the selected second bot; and
selecting an additional bot based on the mapped scores excluding a score of the selected bot.

16. The system of claim 10, wherein the plurality of bots includes one or more client bots, one or more source bots, and one or more external bots.

17. The system of claim 10, wherein the one or more processors are configured for operations further comprising:
transmitting one or more confidence score requests, wherein when the one or more confidence score requests are received by a server executing one or more bots, the server generates confidence scores for the one or more bots.

18. The system of claim 10, wherein the one or more processors are configured for operations further comprising:
executing instructions for the plurality of bots using one or more processors of a device; and
generating the mapped scores using the one or more processors of the device.

19. A non-transitory computer readable medium comprising instructions that, when executed by one or more processors of a device, cause the device to perform operations comprising:
receiving input data as part of a two-way communication session;
simultaneously providing the input data to a plurality of bots;
simultaneously receiving heterogeneous confidence scores for the plurality of bots, wherein a heterogeneous confidence score corresponds to a bot and is generated using an analysis by the bot of the input data, and indicates an association strength between the input data and the bot;
generating mapped scores for the plurality of bots by calibrating the heterogeneous confidence scores with an associated bot score mapper, wherein mapped scores are standardized confidence scores;
selecting a first bot based on a first mapped score for the first bot having a highest value score of the mapped scores;
comparing the first mapped score for the first bot against a first bot specific threshold value;

rejecting the first mapped score when the first mapped score is below the first bot specific threshold value;
selecting a second bot based on a second mapped score for the second bot having a next highest value score of the mapped scores
comparing a second mapped score for a second bot against a second bot specific threshold value, wherein the second bot specific threshold value is different than the first bot specific threshold value;
selecting the second bot based on the second bot meeting the second bot specific threshold value;
facilitating the two-way communication session using the second bot; and
recalibrating one or more of the standardized confidence scores of the bot score mappers, based on the selection of the second bot and the two-way communication session, thereby adjusting subsequent bot selection.

20. The non-transitory computer readable medium of claim 19, wherein when executed by one or more processors of a device, the instructions cause the device to perform operations further comprising processing the input data to identify a bot type associated with the two-way communication session.

21. The non-transitory computer readable medium of claim 19, wherein the plurality of bots are associated with a respective bot type.

22. The non-transitory computer readable medium of claim 19, wherein the selected bot does not have a highest confidence score of self-generated confidence scores generated by the plurality of bots; and
wherein the selected bot has a highest mapped score of the mapped scores for the plurality of bots.

23. The non-transitory computer readable medium of claim 19, wherein when executed by one or more processors of a device, the instructions cause the device to perform operations further comprising:
receiving feedback data; and
updating a mapping adjustment value associated with the input data and the selected bot of the bot score mapper based on feedback data, wherein the feedback data further includes manual feedback provided by an agent participating in the two-way communication session.

24. The non-transitory computer readable medium of claim 19, wherein when executed by one or more processors of a device, the instructions cause the device to perform operations further comprising:
receiving an agent input rejecting the selected second bot; and
selecting an additional bot based on the mapped scores excluding a score of the selected bot.

25. The non-transitory computer readable medium of claim 19, wherein the plurality of bots includes one or more client bots, one or more source bots, and one or more external bots.

26. The non-transitory computer readable medium of claim 19, wherein when executed by one or more processors of a device, the instructions cause the device to perform operations further comprising:
transmitting one or more confidence score requests, wherein when the one or more confidence score requests are received by a server executing one or more bots, the server generates confidence scores for the one or more bots.

27. The non-transitory computer readable medium of claim 19, wherein when executed by one or more processors of a device, the instructions cause the device to perform operations further comprising:
executing instructions for the plurality of bots using one or more processors of a device; and
generating the mapped scores using the one or more processors of the device.

* * * * *